US012284414B2

(12) United States Patent
Xu et al.

(10) Patent No.: US 12,284,414 B2
(45) Date of Patent: Apr. 22, 2025

(54) METHOD FOR SENDING GIFT IN LIVE STREAMING ROOM, METHOD FOR DISPLAYING GIFT IN LIVE STREAMING ROOM, AND RELATED DEVICE

(71) Applicant: Beijing Zitiao Network Technology Co., Ltd., Beijing (CN)

(72) Inventors: Zheheng Xu, Beijing (CN); Xiaoxuan Liu, Beijing (CN); Ke Lin, Beijing (CN); Jianfeng Liu, Beijing (CN); Meilin Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/895,131

(22) Filed: Sep. 24, 2024

(65) Prior Publication Data
US 2025/0016401 A1   Jan. 9, 2025

Related U.S. Application Data

(63) Continuation of application No. PCT/CN2023/096074, filed on May 24, 2023.

(30) Foreign Application Priority Data

May 24, 2022 (CN) .......................... 202210576038.8

(51) Int. Cl.
*H04N 21/435* (2011.01)
*H04N 21/431* (2011.01)
(Continued)

(52) U.S. Cl.
CPC ....... *H04N 21/435* (2013.01); *H04N 21/4316* (2013.01); *H04N 21/4438* (2013.01); *H04N 21/4788* (2013.01)

(58) Field of Classification Search
CPC ............. H04N 21/435; H04N 21/4316; H04N 21/4438; H04N 21/4788
See application file for complete search history.

(56) References Cited

U.S. PATENT DOCUMENTS

2013/0030945 A1   1/2013   Polt
2022/0070538 A1   3/2022   Wang et al.

FOREIGN PATENT DOCUMENTS

CN    106792122 A    5/2017
CN    107040822 A    8/2017
(Continued)

OTHER PUBLICATIONS

China National Intellectual Property Administration, Office Action Issued in Application No. 202210576038.8, Aug. 5, 2023, 20 pages.
(Continued)

*Primary Examiner* — Anthony Bantamoi
(74) *Attorney, Agent, or Firm* — Alleman Hall & Tuttle LLP

(57) ABSTRACT

The present invention provides methods for giving and displaying a gift in a livestreaming room, and a related device. The method for giving a gift in a livestreaming room comprises: in response to a trigger operation for a target gift control, displaying a first window in a livestreaming room page; receiving first information inputted in the first window; and in response to a trigger operation for a gift-giving control, associating the first information with a target gift corresponding to the target gift control and then sending the first information and the target gift to a target receiving end.

20 Claims, 26 Drawing Sheets

(51) Int. Cl.
*H04N 21/443* (2011.01)
*H04N 21/4788* (2011.01)

(56) References Cited

FOREIGN PATENT DOCUMENTS

| | | |
|---|---|---|
| CN | 108882046 A | 11/2018 |
| CN | 111683265 A | 9/2020 |
| CN | 112087669 A | 12/2020 |
| CN | 112218103 A | 1/2021 |
| CN | 113050847 A | 6/2021 |
| CN | 113225573 A | 8/2021 |
| CN | 113596492 A | 11/2021 |
| CN | 113840154 A | 12/2021 |
| CN | 114143572 A | 3/2022 |
| CN | 114915828 A | 8/2022 |

OTHER PUBLICATIONS

ISA China National Intellectual Property Administration, International Search Report and Written Opinion Issued in Application No. PCT/CN2023/096074, Aug. 29, 2023, WIPO, 6 pages.
European Patent Office, Extended European Search Report Issued in Application No. 23811101.7, Mar. 4, 2025, Germany, 137 pages.

METHOD FOR SENDING GIFT IN LIVE STREAMING ROOM, METHOD FOR DISPLAYING GIFT IN LIVE STREAMING ROOM, AND RELATED DEVICE

CROSS-REFERENCE TO RELATED APPLICATIONS

The present disclosure is a continuation application of international application No. PCT/CN2023/096074, which is based on and claims priority to Chinese Patent Application No. 202210576038.8, filed with the China National Intellectual Property Administration on May 24, 2022, and entitled "METHOD FOR SENDING GIFT IN LIVE STREAMING ROOM, METHOD FOR DISPLAYING GIFT IN LIVE STREAMING ROOM, AND RELATED DEVICE", both applications are incorporated herein by reference in their entireties.

TECHNICAL FIELD

The present disclosure relates to the field of computer technologies, and in particular, to a method for sending a gift in a live streaming room, a method for displaying a gift in a live streaming room, and a related device.

BACKGROUND

In the related art, a gift function in a live streaming room is monotonous, and cannot satisfy diverse interaction needs of users, thus affecting the user experience.

SUMMARY

Embodiments of the present disclosure provide a method for sending a gift in a live streaming room, a method for displaying a gift in a live streaming room, and a related device so as to solve or partially solve the above problem.

According to a first aspect of the embodiments of the present disclosure, a method for sending a gift in a live streaming room is provided. The method includes:
  displaying a first window on a live streaming room page in response to a trigger operation on a target gift control;
  receiving first information entered in the first window; and
  associating, in response to a trigger operation on a send control, the first information with a target gift corresponding to the target gift control, and then sending the target gift with the first information to a target receiving end.

According to a second aspect of the embodiments of the present disclosure, a method for displaying a gift in a live streaming room is provided. The method includes:
  receiving and displaying a gift from a target sending end; and
  displaying, in response to the gift being a target gift associated with first information, an information control corresponding to the first information on a live streaming room page.

According to a third aspect of the embodiments of the present disclosure, an apparatus for sending a gift in a live streaming room is provided. The apparatus includes:
  a display module configured to: display a first window on a live streaming room page in response to a trigger operation on a target gift control;
  a receiving module configured to: receive first information entered in the first window; and
  a sending module configured to: associate, in response to a trigger operation on a send control, the first information with a target gift corresponding to the target gift control, and then send the target gift with the first information to a target receiving end.

According to a fourth aspect of the embodiments of the present disclosure, an apparatus for displaying a gift in a live streaming room is provided. The apparatus includes:
  a receiving module configured to: receive a gift from a target sending end; and
  a display module configured to: display the gift, and display, in response to the gift being a target gift associated with first information, an information control corresponding to the first information on a live streaming room page.

According to a fifth aspect of the embodiments of the present disclosure, a computer device is provided, and includes one or more processors and a memory; and one or more programs, where the one or more programs are stored in the memory and executed by the one or more processors, and the program includes instructions used to perform the method according to the first aspect or the second aspect.

According to a sixth aspect of the embodiments of the present disclosure, a non-volatile computer-readable storage medium including a computer program is provided. The computer program, when executed by one or more processors, causes the processor to perform the method according to the first aspect or the second aspect.

According to a seventh aspect of the embodiments of the present disclosure, a computer program product is provided, and includes computer program instructions. The computer program instructions, when executed on a computer, cause the computer to perform the method according to the first aspect or the second aspect.

BRIEF DESCRIPTION OF THE DRAWINGS

In order to more clearly describe the technical solutions in the present disclosure or in the related art, the accompanying drawings for describing the embodiments or the related art will be briefly described below. Apparently, the accompanying drawings in the description below show merely the embodiments of the present disclosure, and those of ordinary skill in the art may still derive other accompanying drawings from these accompanying drawings without creative efforts.

FIG. 2O is a schematic diagram of an exemplary page according to an embodiment of the present disclosure;

DETAILED DESCRIPTION

In order to make the objects, technical solutions, and advantages of embodiments of the present disclosure clearer, the embodiments of the present disclosure are further described in detail below with reference to specific embodiments and the accompanying drawings.

It should be noted that unless otherwise defined, the technical or scientific terms used in the embodiments of the present disclosure shall have general meanings as understood by those of ordinary skill in the art to which the present disclosure pertains. "First", "second", and like words used in the embodiments of the present disclosure do not indicate any order, quantity, or importance, but are merely used to distinguish between different components. "Include" or "comprise" or like words mean that an element or item preceding the term encompasses an element or item or its equivalent listed after the term, without excluding other elements or items. "Connect" or "connected" or like words are not limited to a physical or mechanical connection, but may include an electrical connection, whether direct or indirect. "Up", "down", "left", "right", and the like are merely used to indicate a relative positional relationship, and the relative positional relationship may change accordingly when an absolute position of the described object changes.

Figure 1:
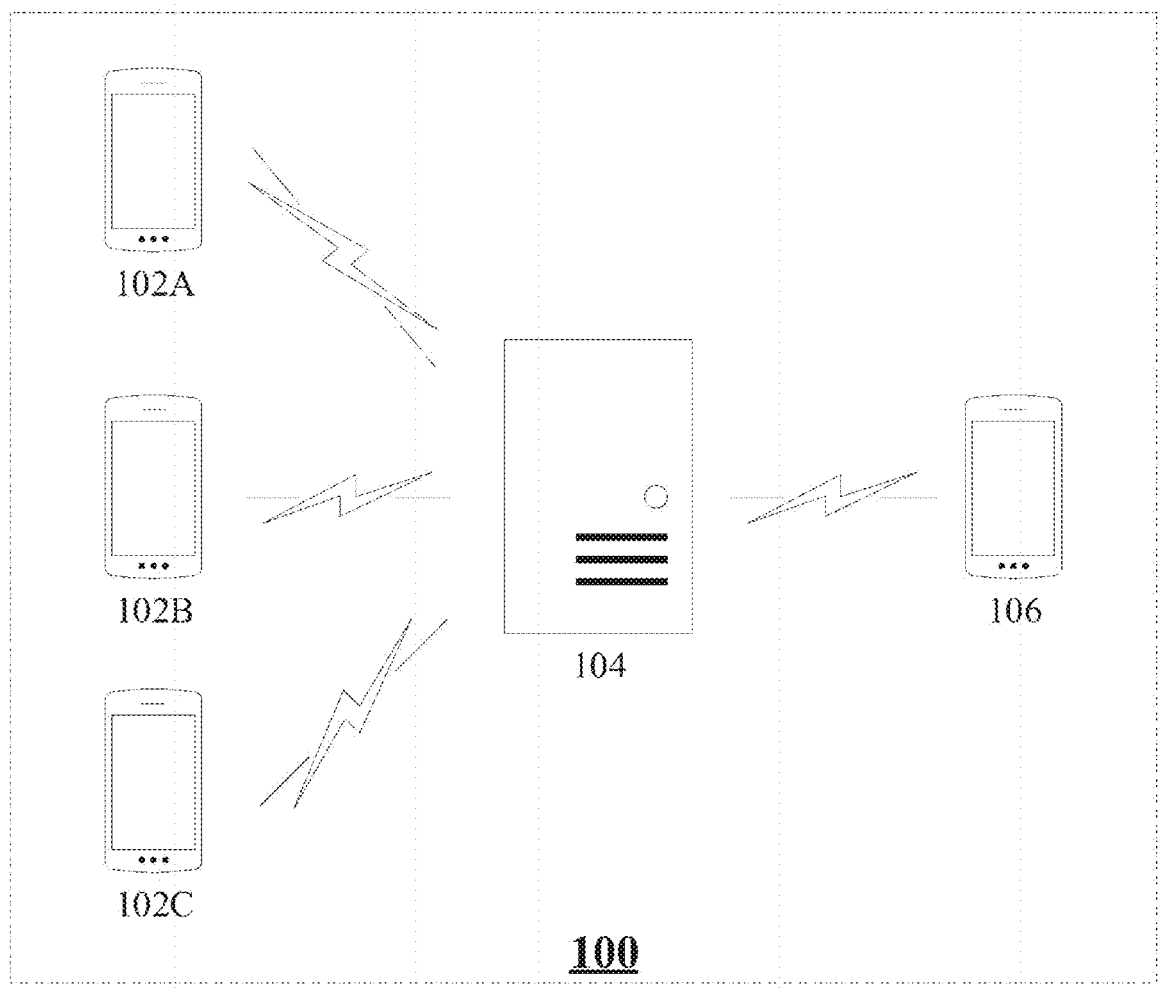
FIG. 1 is a schematic diagram of an exemplary system according to an embodiment of the present disclosure.

FIG. 1 is a schematic diagram of an exemplary system 100 according to an embodiment of the present disclosure.

As shown in FIG. 1, the system 100 may include at least one first terminal (e.g., first terminals 102A to 102C), a server 104, and a second terminal 106. In some embodiments, the system 100 may be applied to a live streaming scenario. For example, the server 104 is configured to provide a live streaming service, where the first terminals 102A to 102C may be terminals corresponding to users who view a live streaming event, and the second terminal 106 may be a terminal corresponding to a user who initiates the live streaming event. In some embodiments, when the system 100 is applied to a multi-person interactive live streaming scenario, there may also be a plurality of second terminals 106.

The server 104 may be a single server or a plurality of servers. In a scenario of a plurality of servers, these servers may use a distributed architecture and form a server cluster.

The first terminals 102A to 102C and the second terminal 106 may be any terminal device, such as a mobile terminal (e.g., a mobile phone and a tablet computer (Pad)), or a fixed terminal (e.g., a personal computer (PC) and a laptop). The first terminals 102A to 102C and the second terminal 106 may run applications and provide the users with corresponding services via the applications, such as a live streaming service.

Embodiments of the present disclosure provide a method for sending a gift in a live streaming room, a method for displaying a gift in a live streaming room, and a related device. A gift is associated with entered information, so that the function of sending the gift along with the information is achieved, thereby solving the problem of a monotonous gift function in the live streaming room and improving the user experience.

Figure 2A:
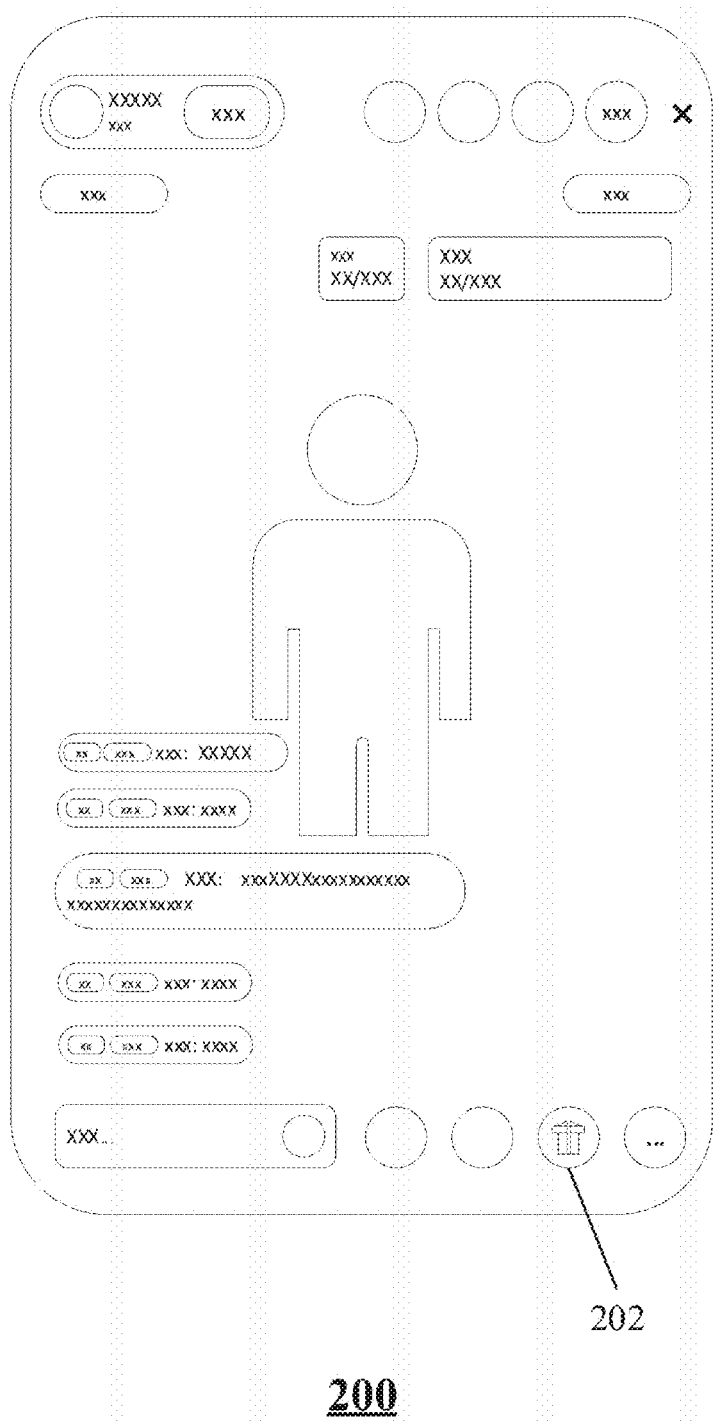
FIG. 2A is a schematic diagram of an exemplary page according to an embodiment of the present disclosure.

FIG. 2A is a schematic diagram of an exemplary page 200 according to an embodiment of the present disclosure.

As shown in FIG. 2A, after the second terminal 106 initiates a live streaming event, the server 104 correspondingly creates a live streaming room based on an initiation instruction. After the first terminals 102A to 102C enter the live streaming room, the page 200 shown in FIG. 2A may be correspondingly displayed.

In some embodiments, as shown in FIG. 2A, a gift identifier 202 may be displayed on the page 200. The gift identifier 202 may be an icon in the shape of a gift, thereby prompting the user that a function of sending a gift can be triggered by tapping the gift identifier 202.

Figure 2B:
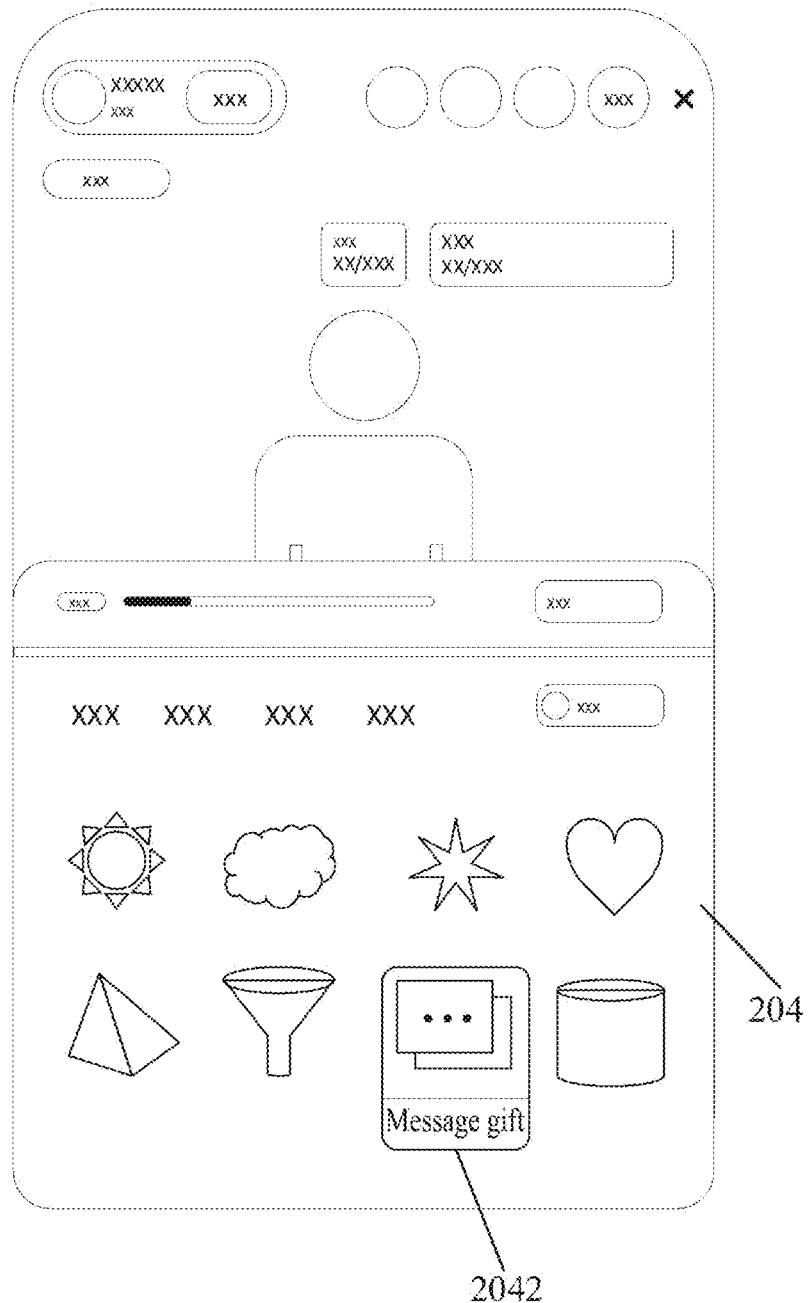
FIG. 2B is a schematic diagram of an exemplary page according to an embodiment of the present disclosure.

If the user of the first terminal 102A taps the gift identifier 202, the first terminal 102A may display a window for selecting gifts on the page 200 in response to a trigger operation for the gift identifier 202. FIG. 2B is a schematic diagram of another exemplary page 200 according to an embodiment of the present disclosure. As shown in FIG. 2B, when the gift identifier 202 is triggered, a window 204 (e.g., a third window) may pop up on the page 200. The window 204 may include various virtual gifts, and the user may select a corresponding gift and send it to a live streamer.

In some embodiments, when a live streaming room corresponding to the page 200 satisfies a preset filtering rule, a target gift control 2042 may be included in the window 204, as shown in FIG. 2B.

The preset filtering rule may be a rule for displaying the target gift control 2042 in the window 204 only when a condition is satisfied, so as to distinguish between live streaming scenarios under different conditions and more specifically offer interactive functions targeted for a specific live streaming scenario, thereby enriching product experience.

As an optional embodiment, the preset filtering condition may be that an interaction type of a live streaming room meets a preset interaction type condition. For example, the interaction type of the live streaming room is a multi-person interactive live streaming room. Specifically, when the live streaming room is a multi-person interactive live streaming scenario, it may be considered that the preset filtering rule is satisfied, and therefore when the gift identifier 202 is triggered, the target gift control 2042 is displayed in the window 204 on the page 200, thereby enriching an interaction method of the multi-person interactive live streaming scenario.

In some embodiments, the preset filtering condition may also be that a live streaming content type of a live streaming room meets a preset content type condition. For example, the content type of the live streaming room is a performance live streaming content type, etc.

It should be understood that the preset filtering rule exemplified above is only exemplary. In some scenarios, such restrictions may not be imposed, and the target gift control 2042 may be provided in all live streaming rooms.

It should be noted that only one target gift control 2042 is marked in FIG. 2B, and the target gift control 2042 may be a specific control. In other words, a subsequent step of entering information can be triggered only when the control 2042 is tapped, thereby limiting a control that triggers an information input mechanism, ensuring basic functions of other common gifts, and enriching the product function.

Figure 2C:
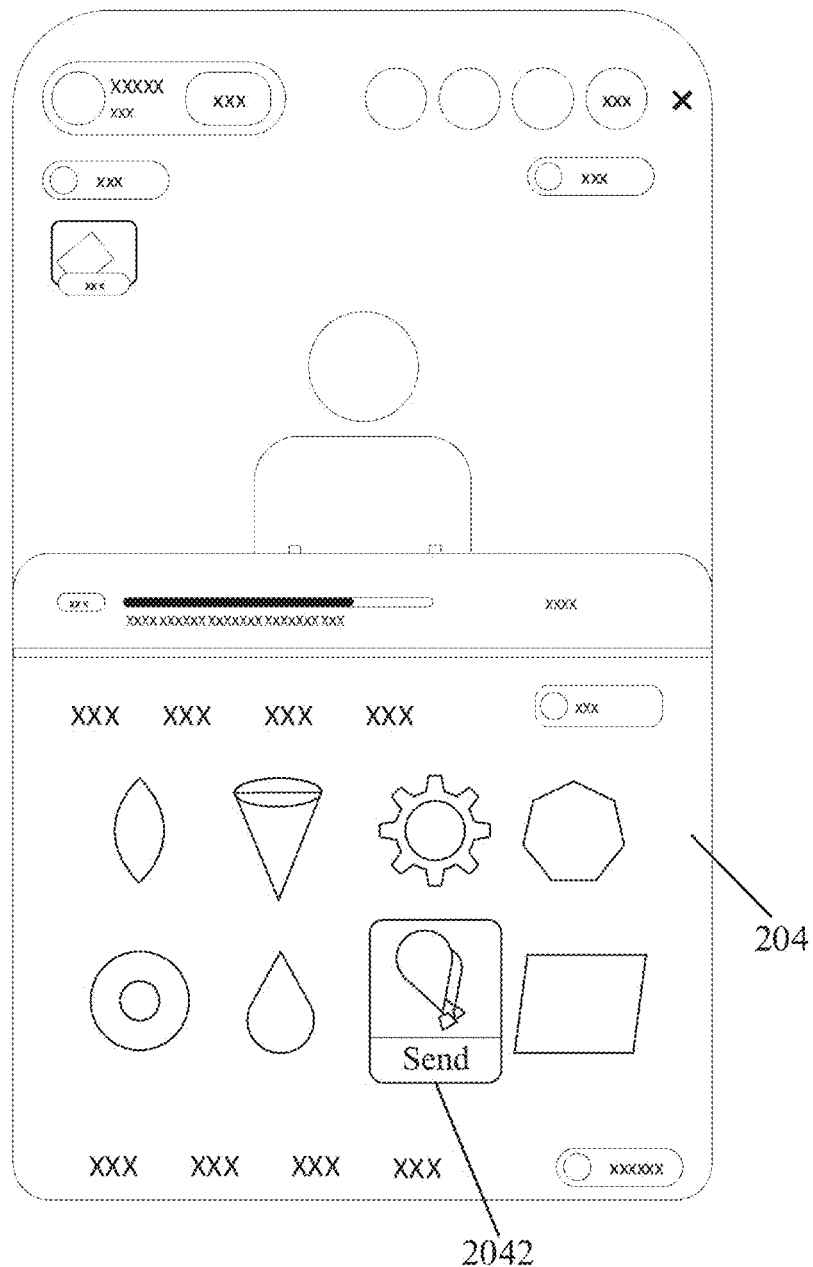
FIG. 2C is a schematic diagram of an exemplary page according to an embodiment of the present disclosure.

It should be understood that in some embodiments, there may be more target gift controls 2042. Even each gift icon displayed in the window 204 may correspond to one target gift control 2042. FIG. 2C is a schematic diagram of another exemplary page 200 according to an embodiment of the present disclosure. As shown in FIG. 2C, each gift icon in the window 204 may correspond to one target gift control 2042. That is, when the user taps any gift icon, a subsequent step of entering information can be triggered.

Then, when the user taps the target gift control 2042, the first terminal 102A may further display a new window (e.g., a first window) on the page 200 in response to a trigger operation on the target gift control 2042, for the user to enter information. Specifically, the first window may be a gift message input window for an audience user to enter a gift message, so as to send the message to the live streamer while sending a gift to a live streamer user, where the gift message indicates a message associated with the gift.

Figure 2D:
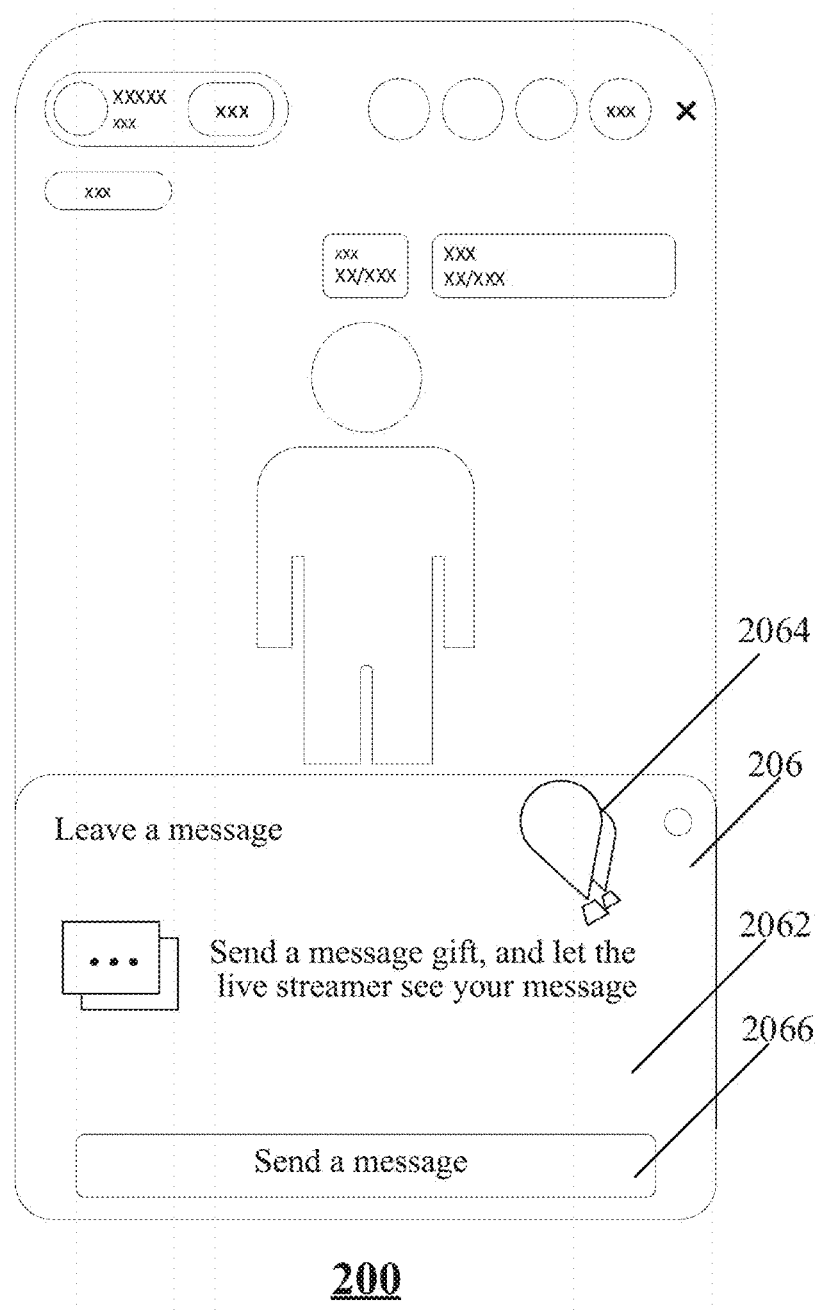
FIG. 2D is a schematic diagram of an exemplary page according to an embodiment of the present disclosure.

FIG. 2D is a schematic diagram of another exemplary page 200 according to an embodiment of the present disclosure. As shown in FIG. 2D, the target gift control may be a message gift control, which may be associated with a fixed gift. When the target gift control 2042 is triggered, a window 206 (e.g., a first window) may pop up on the page 200. The window 206 may include some prompt information that may prompt the user of functions and operations, which may specifically be prompt information that instructs the user to enter a gift message, such as "Leave a message", and "Tap to enter your message with no more than XX words", and may further include an information input field 2062, which may specifically be an information input field for a gift message. The user may enter content of a message the user wants to leave to the live streamer in the information input field 2062, and the information input field may be a text input field, a voice input field, or the like. In some embodiments, an icon 2064 of the target gift may also be displayed in the window 206, so that the user can be prompted about a style of a gift to be sent. With reference to FIG. 2C and FIG. 2D, in some embodiments, when the window 206 is displayed, the window 204 may be hidden so as to save a display space of the page 200.

Figure 2E:
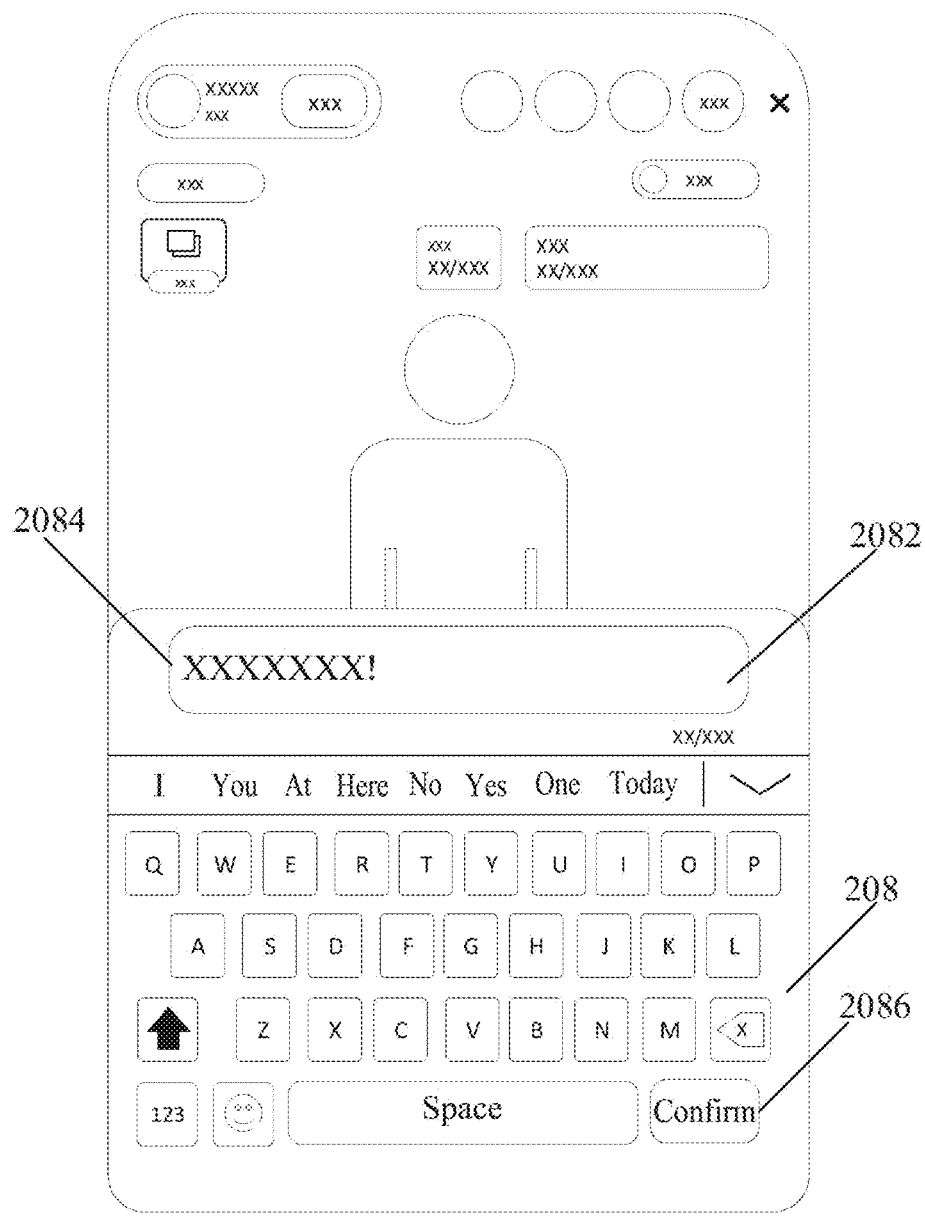
FIG. 2E is a schematic diagram of an exemplary page according to an embodiment of the present disclosure.

In some embodiments, when the user selects the information input field 2062, an input method window may be displayed on the page 200. FIG. 2E is a schematic diagram of another exemplary page 200 according to an embodiment of the present disclosure. As shown in FIG. 2E, when the user selects the information input field 2062, an input method window 208 may be displayed on the page 200. The window 208 may further include an information input field 2082 and an input keyboard. When the user enters information using the input keyboard, the first terminal 102A may receive information 2084 entered by the user in the window 208 and display the information 2084 in the information input field 2082 of the window 208, thereby providing feedback to the user about the entered content and serving as a prompt. The information 2084 may be first information, which is information entered by the user in the information input field, such as a gift message. With reference to FIG. 2D and FIG. 2E, in some embodiments, when the window 208 is displayed, the window 206 may be hidden so as to save a display space of the page 200. In some embodiments, when the information entered by the user satisfies requirements, the first terminal 102A may also use the information as information added to the gift.

As shown in FIG. 2E, the window 208 may further include a confirm control 2086. When the user taps the confirm control 2086, the first terminal 102A may return to the page 200 including the window 206 in response to a trigger operation on the confirm control 2086, as shown in FIG. 2F.

Figure 2F:
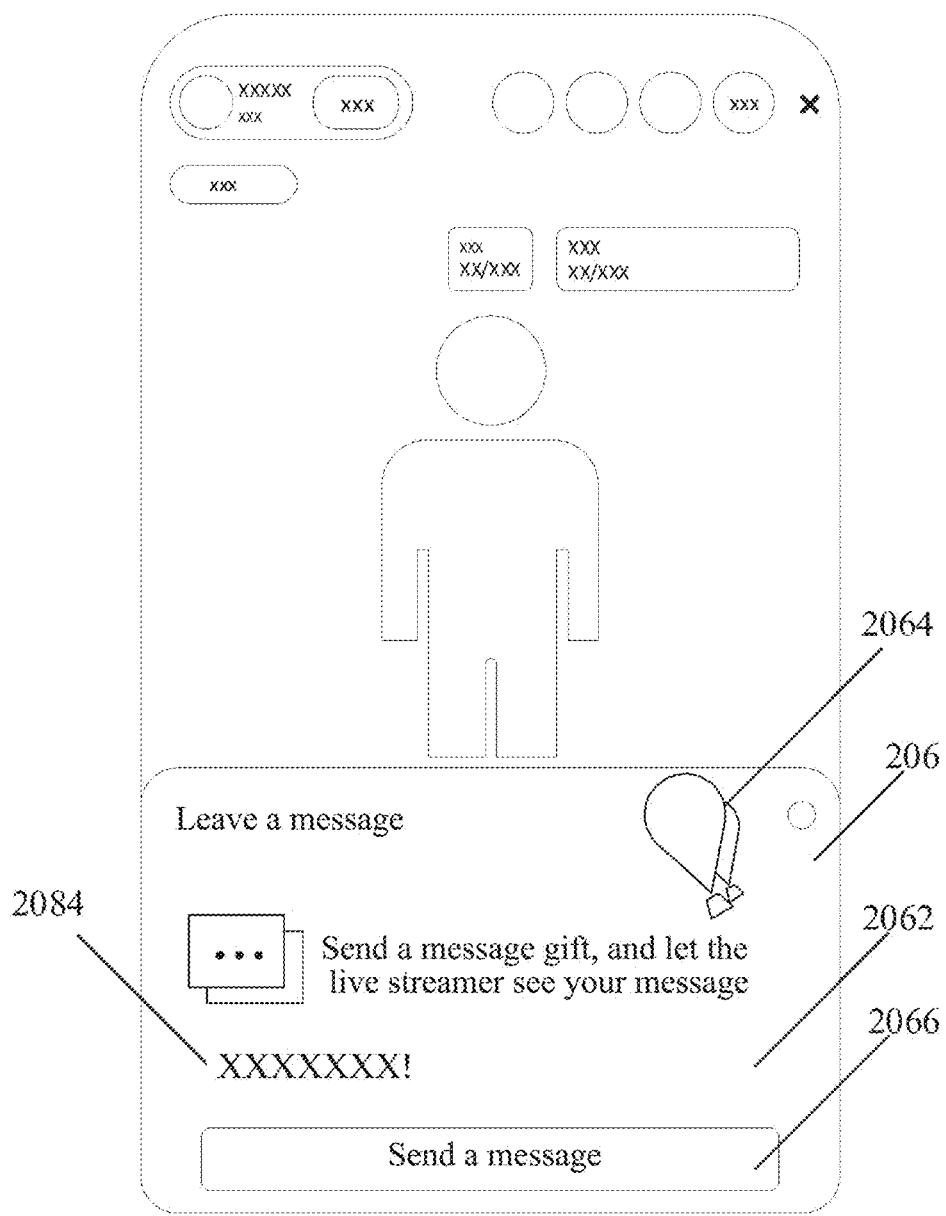
FIG. 2F is a schematic diagram of an exemplary page according to an embodiment of the present disclosure.

As shown in FIG. 2F, the window 206 may further include a send control 2066. After the user taps the send control 2066, the first terminal 102A may associate, in response to a trigger operation on the send control 2066, the information 2084 with a target gift (e.g., the target gift corresponding to the icon 2064 in FIG. 2F is a balloon) corresponding to the target gift control and then send the target gift with the information to a target receiving end, such as the second terminal 106.

It should be understood that when the target gift associated with the information 2084 is sent, the first terminal 102A may generate a gift sending request based on the target gift associated with the information 2084, and then send the gift sending request to the server 104, and then, the server 104 sends the target gift associated with the information 2084 to the second terminal 106, such that the second terminal 106 may receive and correspondingly display the target gift associated with the information 2084.

In some embodiments, after the user taps the send control 2066, the step of associating the information 2084 with the target gift for sending may not be immediately triggered. Instead, in response to the trigger operation on the send control 2066 in the window 206, a new window (e.g., a fourth window) is displayed on the page 200, and the new window may include a resource exchange entry for resource exchange; and in response to completing a resource transfer operation for the resource exchange entry, the first terminal 102A may associate the information 2084 with the target gift, and then send the target gift with the information to the target receiving end (e.g., the second terminal 106). Therefore, after the resource transfer is completed, the information 2084 and the target gift are associated to be sent to the target receiving end, thereby enriching a gift interaction method for the live streaming room. The user may express positive incentives to the live streamer in a resource transfer manner, thereby enhancing the interactive atmosphere. Optionally, the resource may be a virtual resource, and may be transferred from one resource pool to another resource pool in a virtual network space.

In some other embodiments, after the user taps the send control 2066, the step of associating the information 2084 with the target gift for sending may not be immediately triggered. Instead, in response to a trigger operation on a send control in the first window, a new window is displayed on the live streaming room page, and the new window may include a plurality of candidate gifts for the user to select.

Figure 2G:
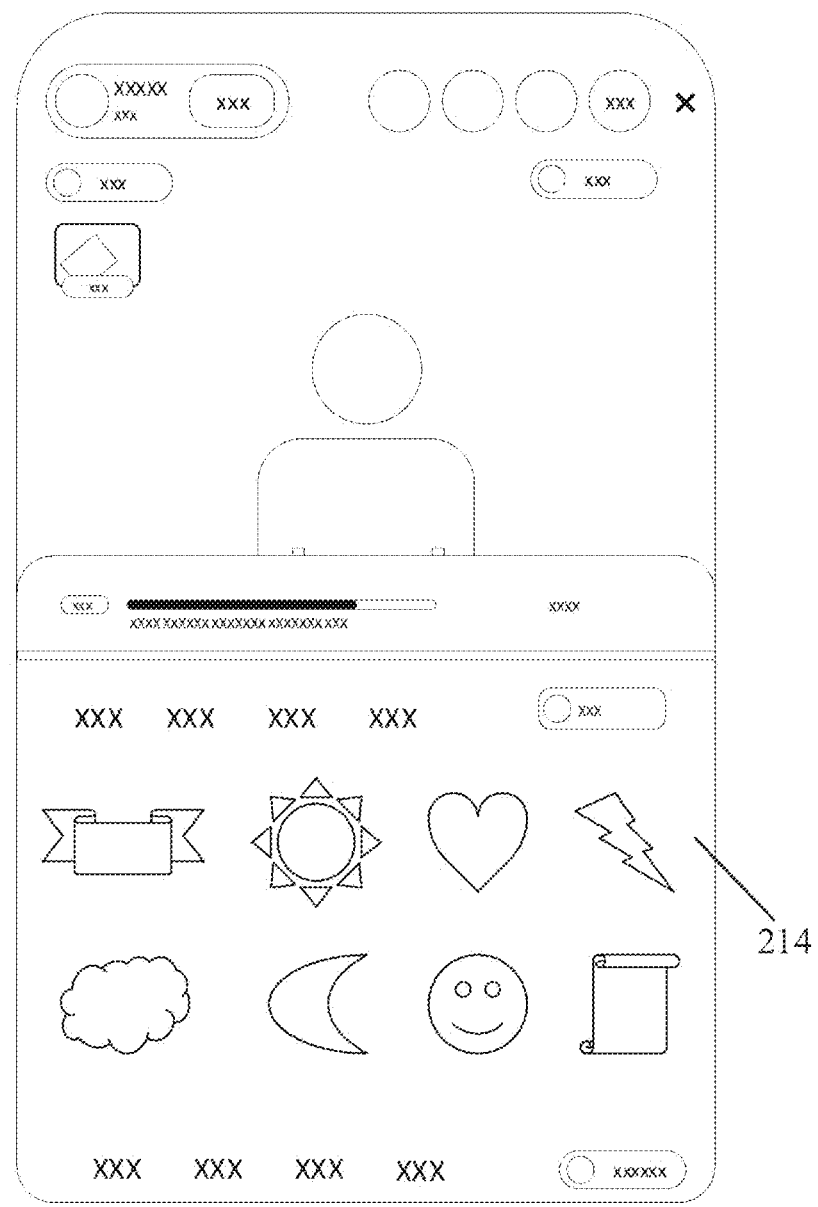
FIG. 2G is a schematic diagram of an exemplary page according to an embodiment of the present disclosure.

FIG. 2G is a schematic diagram of another exemplary page 200 according to an embodiment of the present disclosure. As shown in FIG. 2G, a window 214 is displayed on the page 200, and includes more candidate gifts. The user may select a favorite gift from these candidate gifts for sending. In response to a trigger operation for a target candidate gift from the plurality of candidate gifts, after associating the information 2084 with the target candidate gift, the first terminal 102A may send the target candidate gift with the information to a target receiving end. In this embodiment, the user may associate a message with any one of the gifts, that is, the message may be associated with a random gift. Therefore, the user can send a wide variety of gifts by providing the window 214 (e.g., a fifth window) including many candidate gifts after the user taps the send button 2066, thereby enriching the gift selections for the user, and improving the user experience.

In some embodiments, after the first terminal 102A sends the target gift associated with the information 2084, the first terminal 102A may cease display of the window 206 and display an effect corresponding to the target gift on the page 200. The effect corresponding to the target gift may be an image, audio, a video, or the like corresponding to the target gift.

Figure 2H:
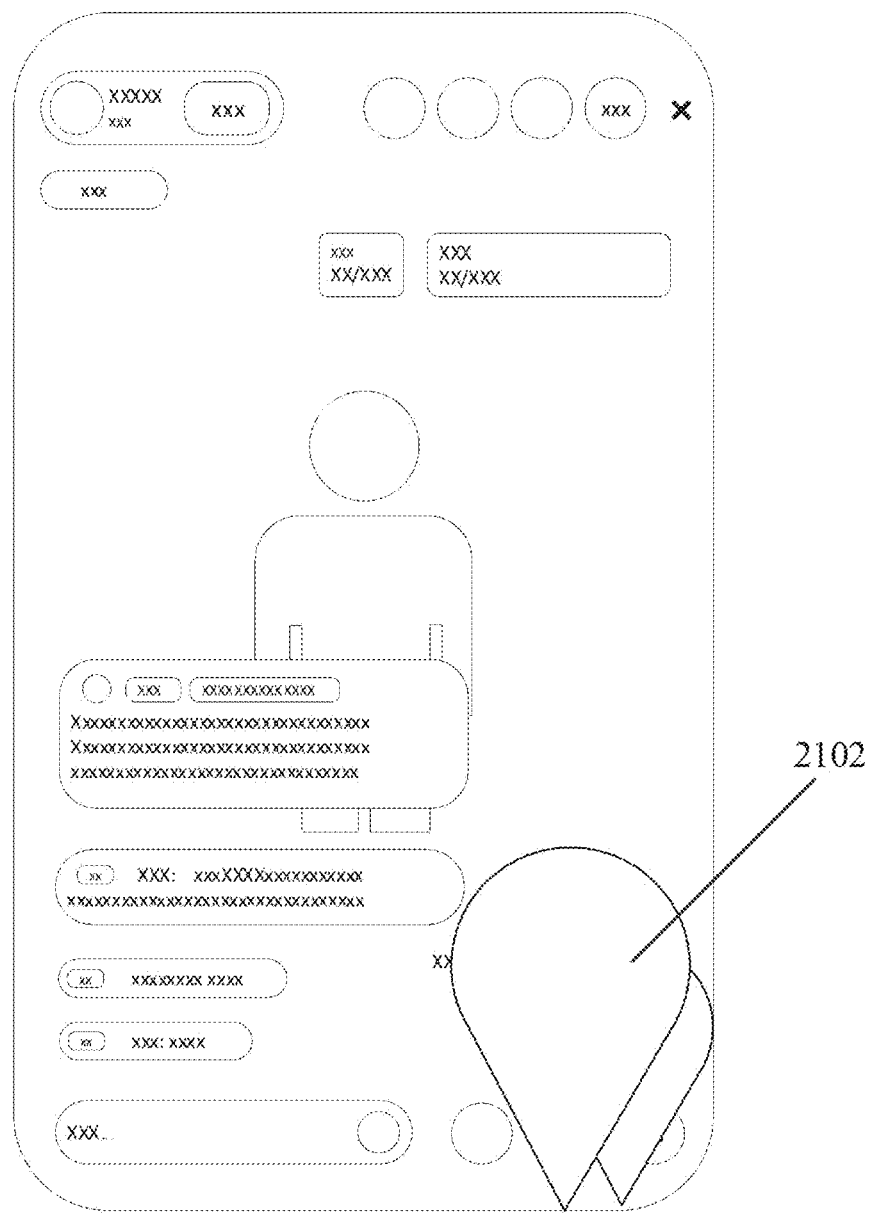
FIG. 2H is a schematic diagram of an exemplary page according to an embodiment of the present disclosure.

FIG. 2H is a schematic diagram of another exemplary page 200 according to an embodiment of the present disclosure. As shown in FIG. 2H, display of the window 206 is ceased on the page 200, and an effect 2102 corresponding to the target gift is displayed on the page 200. For example, the effect 2102 may be balloons gradually rising from the bottom of the page 200.

Figure 2I:
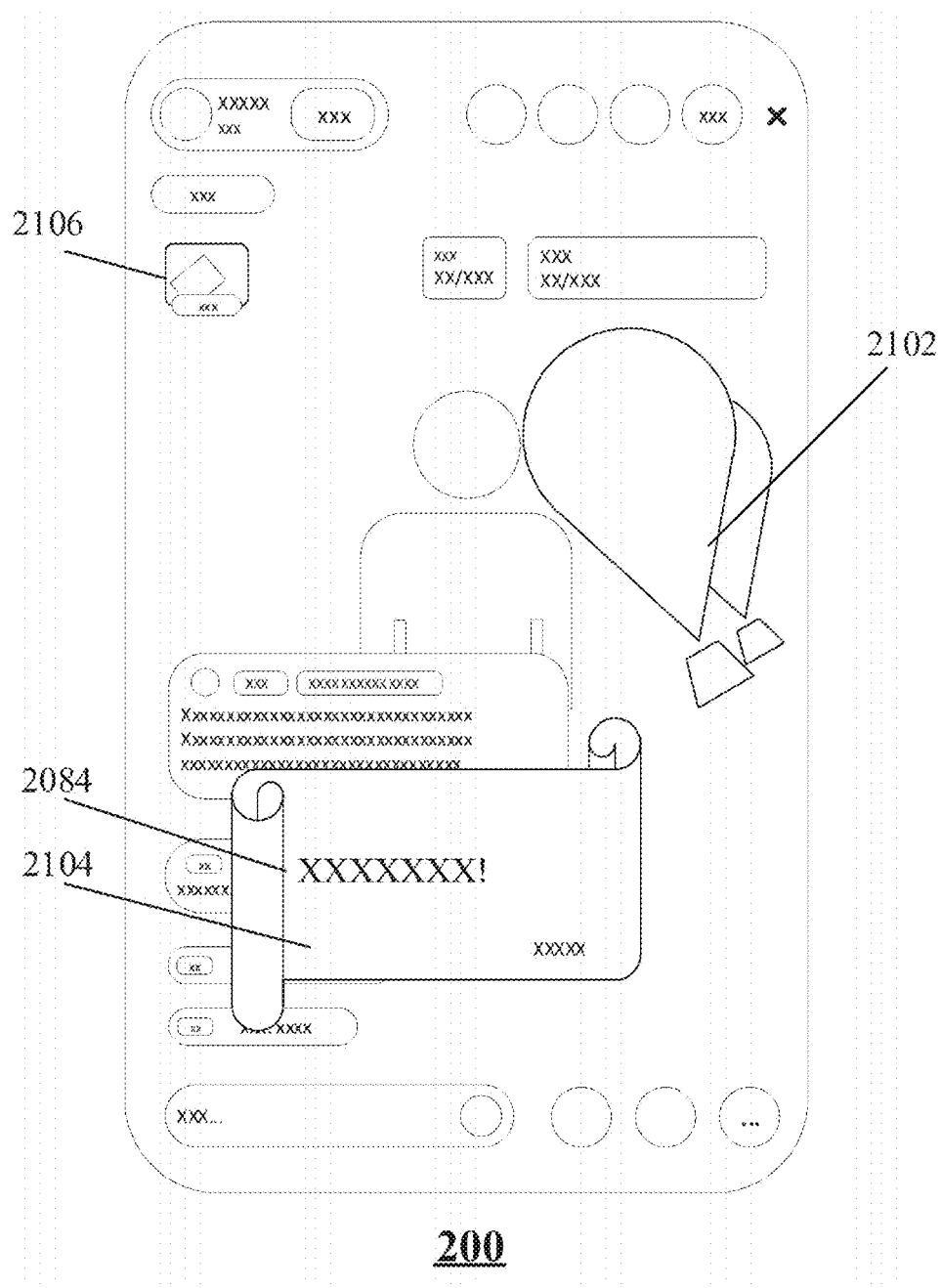
FIG. 2I is a schematic diagram of an exemplary page according to an embodiment of the present disclosure.

In some embodiments, the information 2084 may also be displayed, and the information 2084 and the target gift may not be displayed synchronously. FIG. 2I is a schematic diagram of another exemplary page 200 according to an embodiment of the present disclosure. As shown in FIG. 2I, after a gift effect is displayed on the page 200 for a period of time (e.g., balloons have risen to a certain position of the page 200), the information 2084 starts to be displayed on the page 200, such that there is a sequential order between gift display and information display, thereby better enriching the visual effect and improving the user experience. In some embodiments, as shown in FIG. 2I, the display of the information 2084 may also have a corresponding text-based effect 2104, such as an effect of unfolding a scroll, thereby further enriching the visual effect and improving the user experience.

In some embodiments, as shown in FIG. 2I, an information control 2106 corresponding to the information 2084 may also be displayed on the page 200. The information control 2106 may display introduction information corresponding to the gift message, which serves as a prompt for the information associated with the gift. The information control 2106 may be a gift message aggregated entry, which may display one or more corresponding gift messages when a trigger is received. When there are a plurality of gift messages, the plurality of gift messages may be gift messages sent by a plurality of sending ends. As an optional embodiment, after the user sends a target gift associated with the information 2084, the information control 2106 may display an effect of receiving a mail, for example, in a style that a letter is placed into an envelope, thereby enriching the interactive function and the visual effect of the product.

After the user taps the information control 2106, the first terminal 102A may display a new window (e.g., a second window) on the page 200 in response to a trigger operation on the information control 2106, for displaying the information 2084, and a plurality of pieces of information (e.g., second information) associated with the target gift that are sent by other first terminals and received by a live streamer (e.g., the second terminal 106) of the live streaming room within a first preset time T1. In other words, one or more gift messages may be displayed in the second window in response to the trigger operation on the information control 2106. In the second window, the first information or the second information may be displayed, or both the first information and the second information may be displayed. the first information and the second information may be gift messages sent to the target receiving end (e.g., a live streamer terminal) from different sending ends (e.g., audience terminals).

Figure 2J:
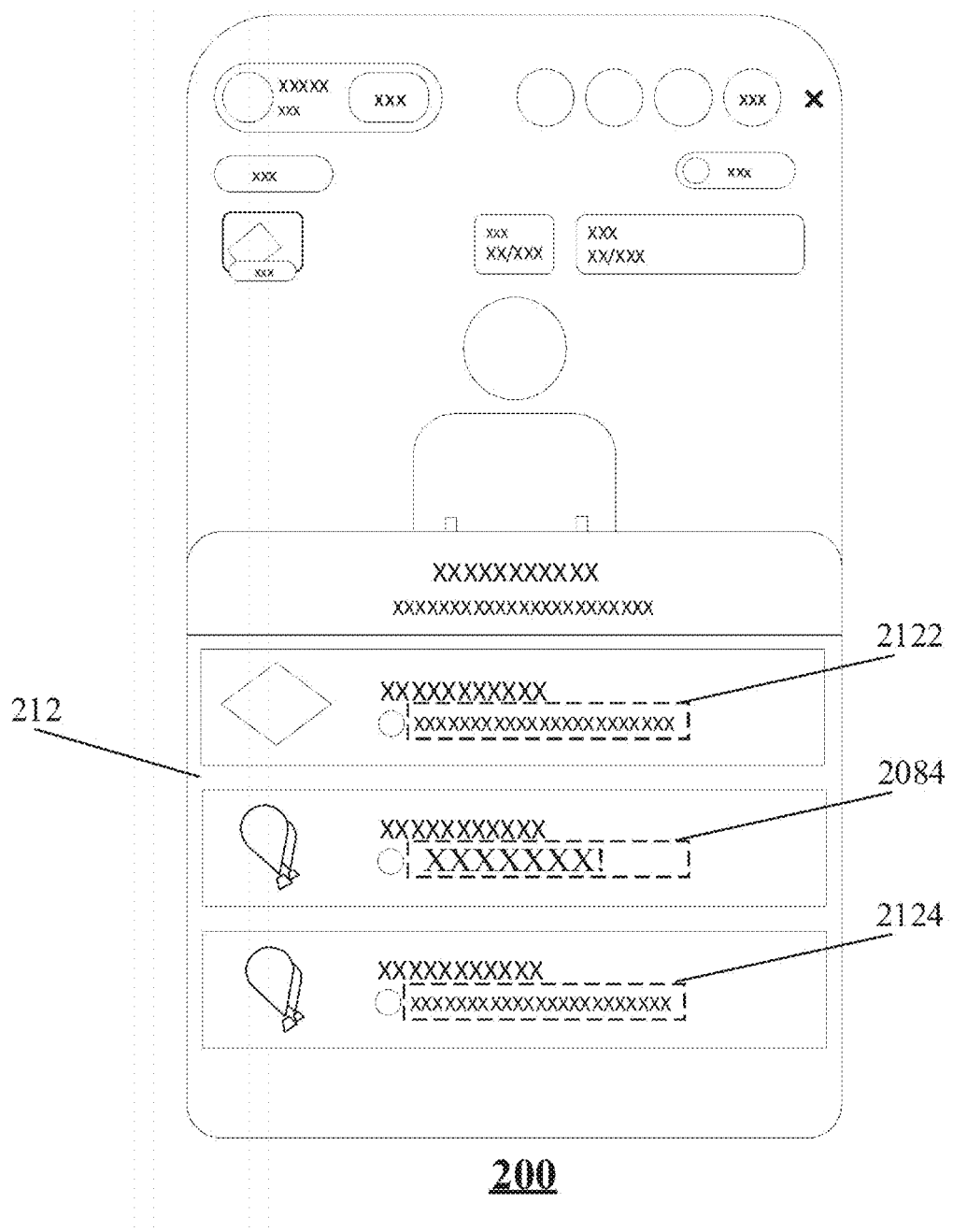
FIG. 2J is a schematic diagram of an exemplary page according to an embodiment of the present disclosure.

FIG. 2J is a schematic diagram of another exemplary page 200 according to an embodiment of the present disclosure. As shown in FIG. 2J, the window 212 may include the information 2084, and a plurality of pieces of information 2122 and 2124 associated with the target gift that are sent by other first terminals and received by the second terminal 106 (the second terminal is a receiving end of a gift and a gift message, such as a live streamer terminal) within a first preset time (e.g., these pieces of information may be arranged chronologically, and an earlier question ranking ahead is used as an example). The information 2122 and the information 2124 that are sent by the other first terminals (the first terminal is a sending end of a gift and a gift message, such as an audience terminal) and associated with the target gift may be second information, namely, gift messages sent by different first terminals also called the sending ends. Therefore, after tapping the information control 2106, the user may view information sent by various users to the live streamer through gifts in the window 212, thereby enriching the product function. In some embodiments, in addition to displaying information associated with gifts sent by users, the window 212 may also display avatars, nicknames, and brief introductions of the corresponding users, the time when the gift is sent, and other information to enrich content displayed in the window 212.

In some embodiments, as shown in FIG. 2J, when a user may send different gifts using different target gift controls 2042 or gifts sent by users are different, icons of gifts corresponding to respective information may also be correspondingly displayed in the window 212, such that the user may know, while viewing the information, what gifts the other users have sent, thereby further enriching the product function.

It should be understood that the information associated with the gifts and received by the second terminal 106 within the first preset time T1 is displayed in the window 212, and the first preset time T1 may be set as needed.

For example, the first preset time T1 may be the latest half hour or the latest hour. In some cases, due to a small amount of information, the first preset time T1 may be set longer, even to an entire live streaming period (i.e., the first preset time T1 is as long as duration of the live streaming event).

Figure 2K:
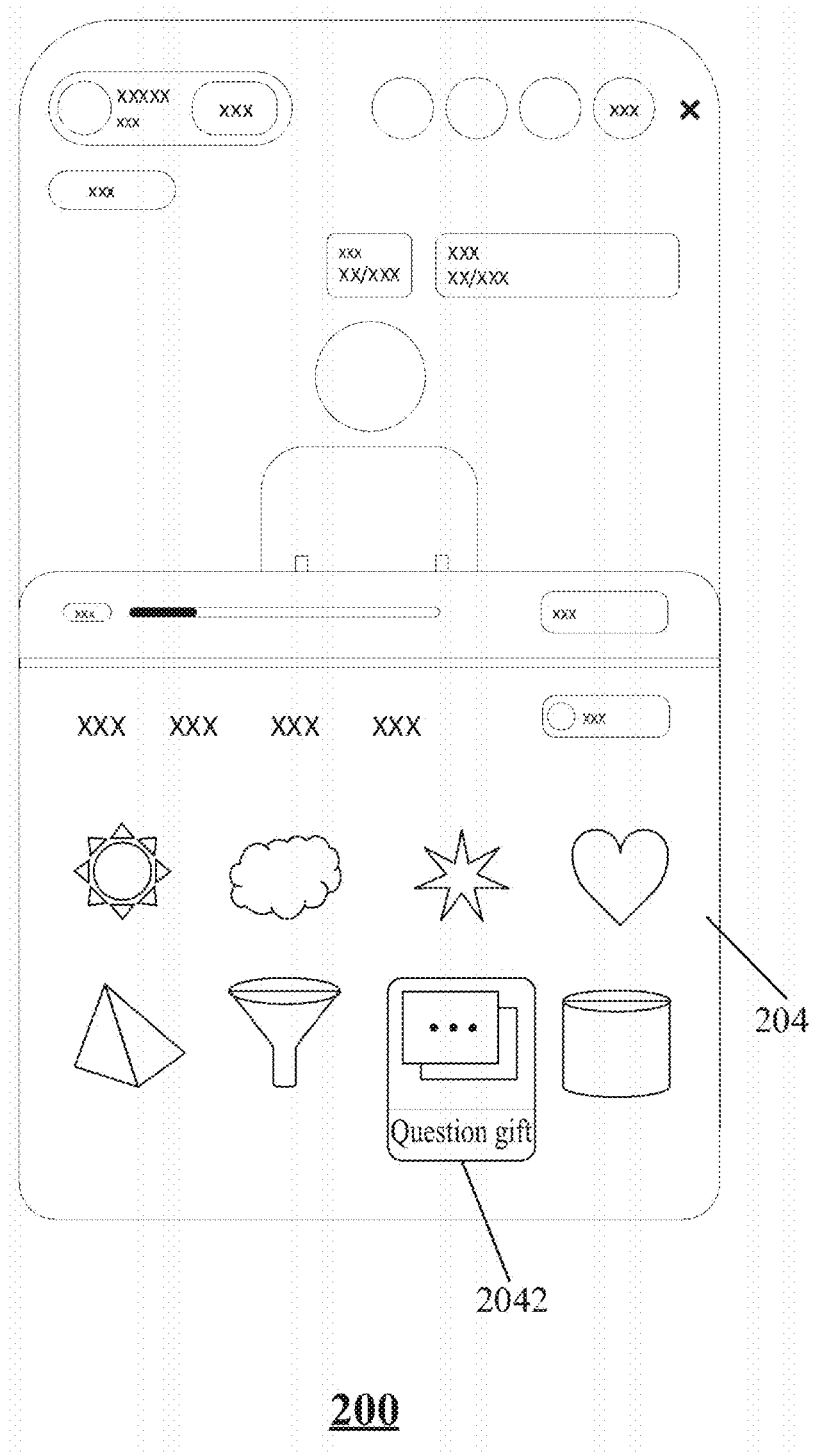
FIG. 2K is a schematic diagram of an exemplary page according to an embodiment of the present disclosure.
Figure 2L:
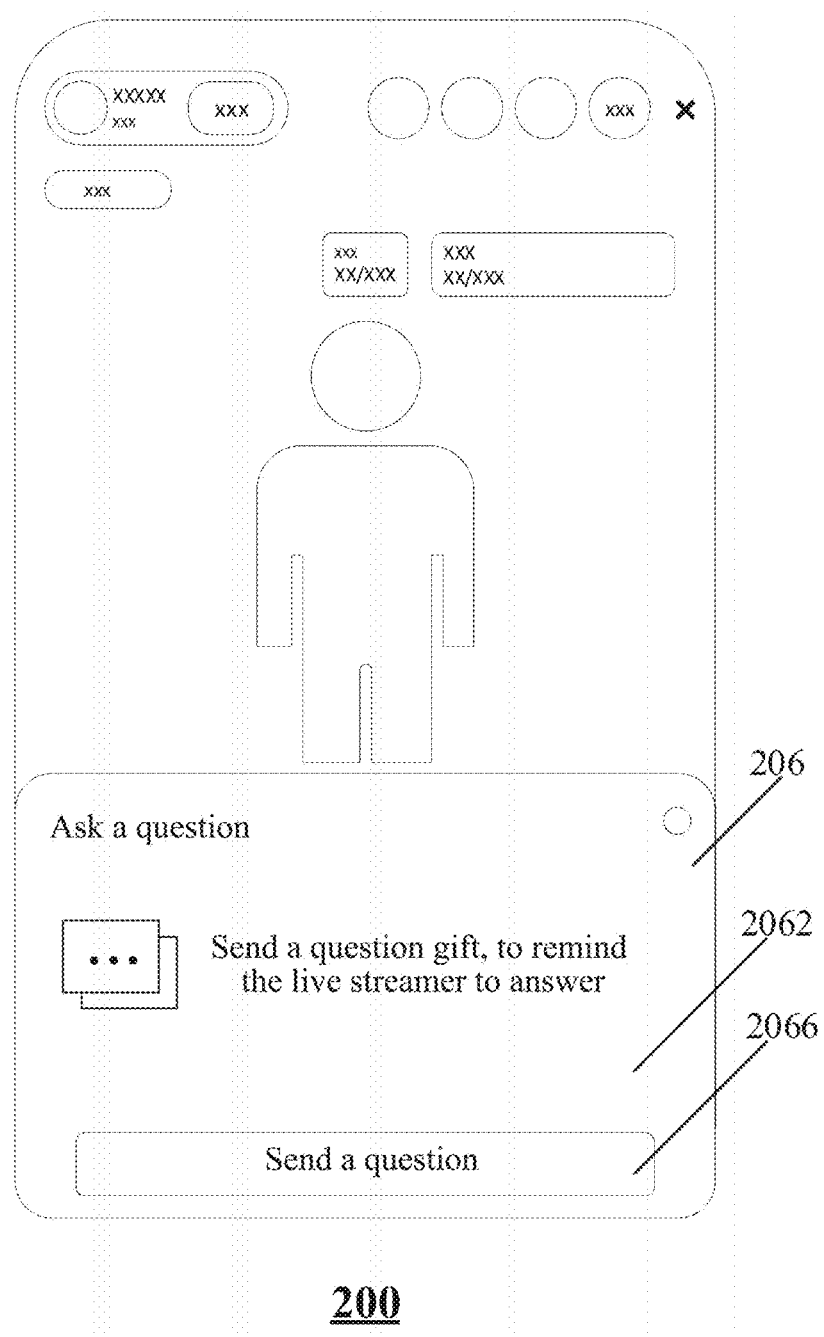
FIG. 2L is a schematic diagram of an exemplary page according to an embodiment of the present disclosure.

In some embodiments, the above embodiments for associating gifts with information may be applied to a specific scenario, such as a scenario of a live streaming room with question and answer requirements. The target gift control 2042 may be a special question gift, as shown in FIG. 2K. In this scenario, there may be only one question gift icon in the window 204 corresponding to the target gift control 2042, and moreover, the window 206 for information input can be displayed only when the user triggers the control 2042, as shown in FIG. 2L. Therefore, in this scenario, the user may ask a question to the live streamer through the question gift, thereby satisfying gift interaction and message interaction needs of the user, and avoiding the problem that a question posed through interaction with the live streamer on a public chat is easily obscured by a large number of comments and consequently, timely response from the live streamer is unavailable.

Figure 2M:
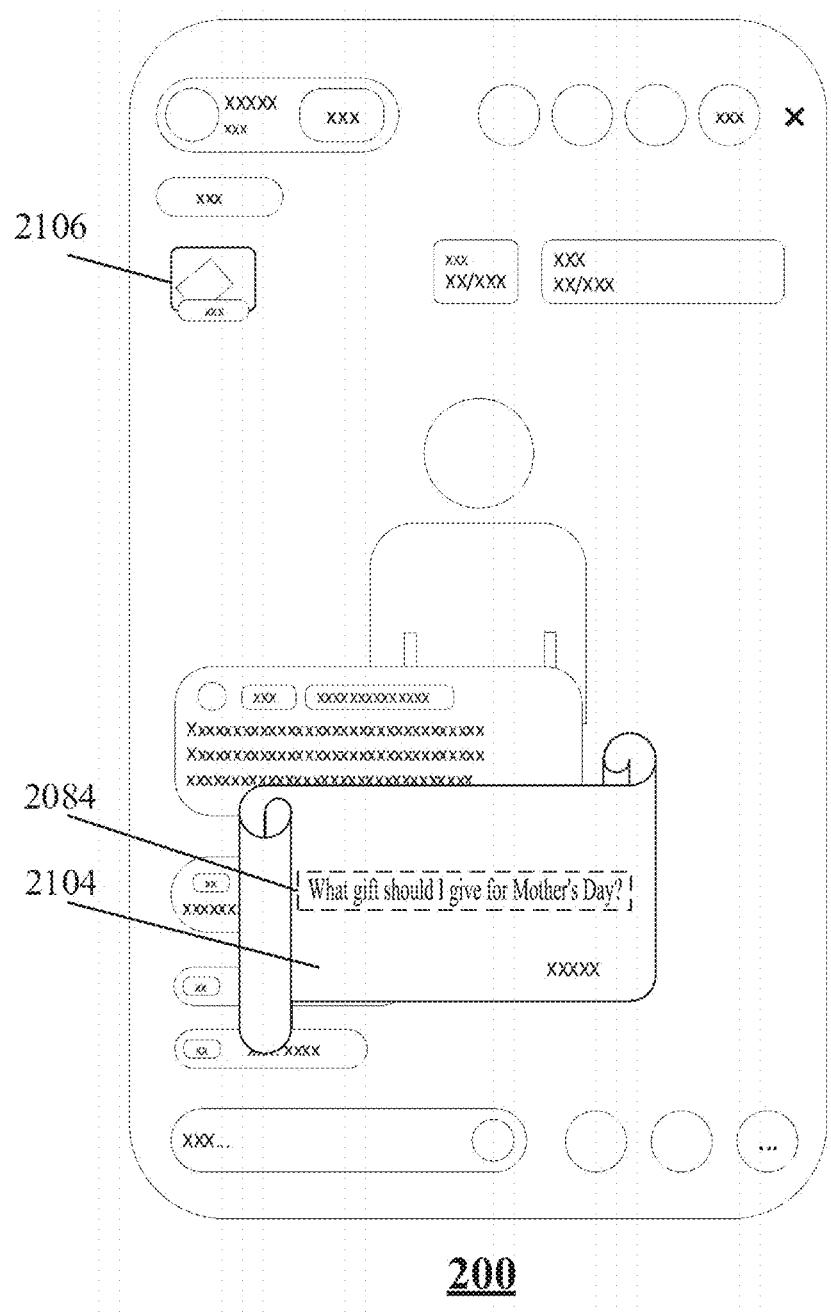
FIG. 2M is a schematic diagram of an exemplary page according to an embodiment of the present disclosure.

In some embodiments, since the question gift is used to allow the live streamer to answer the question of the user, the gift, when displayed on the page, may be displayed together with the information 2084. FIG. 2M is a schematic diagram of another exemplary page 200 according to an embodiment of the present disclosure. As shown in FIG. 2M, an effect 2104 for a question gift is displayed on the page 200. The effect 2104 may be an effect of a scroll. A corresponding question 2084 is displayed when the scroll unfolds, thereby highlighting functionality of the question gift, providing a more distinctive visual effect, and improving the user experience.

Figure 2N:
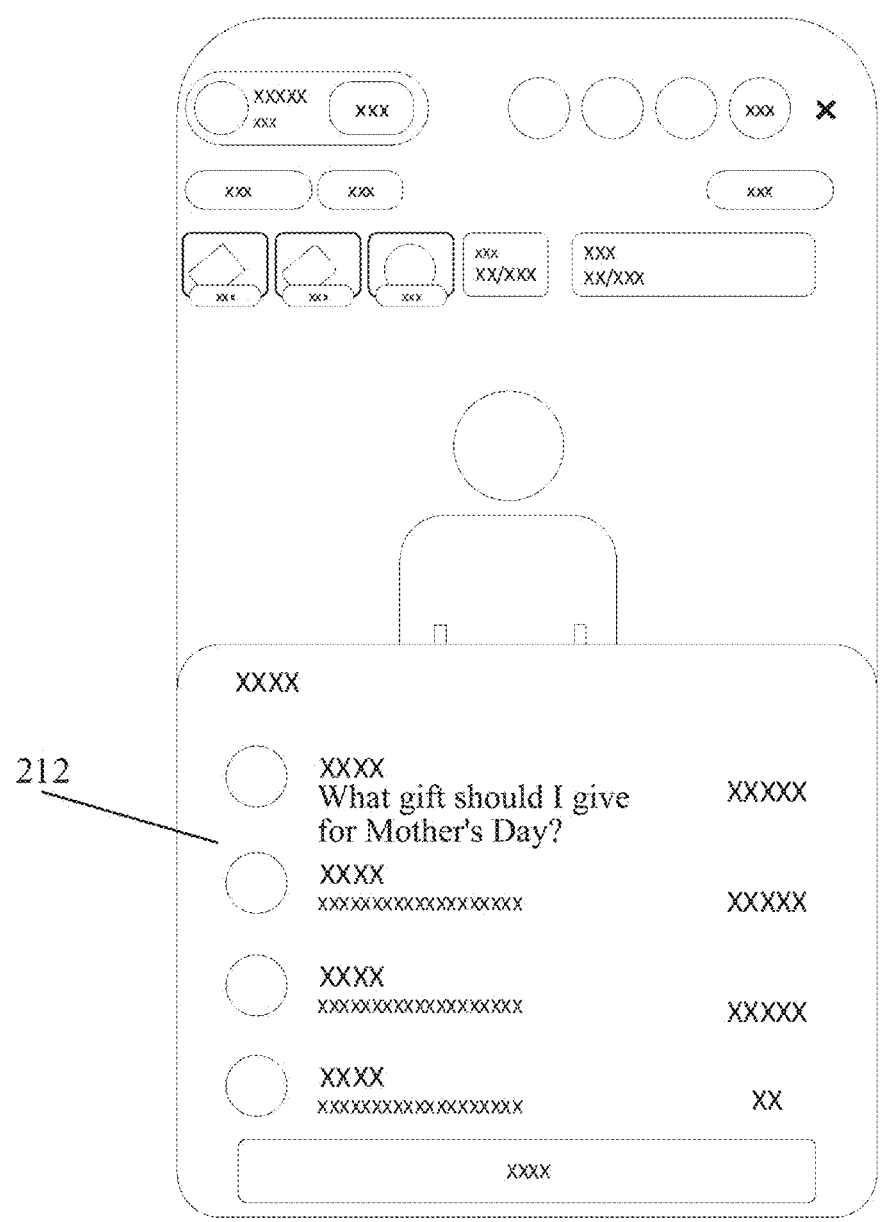
FIG. 2N is a schematic diagram of an exemplary page according to an embodiment of the present disclosure.
Figure 20:
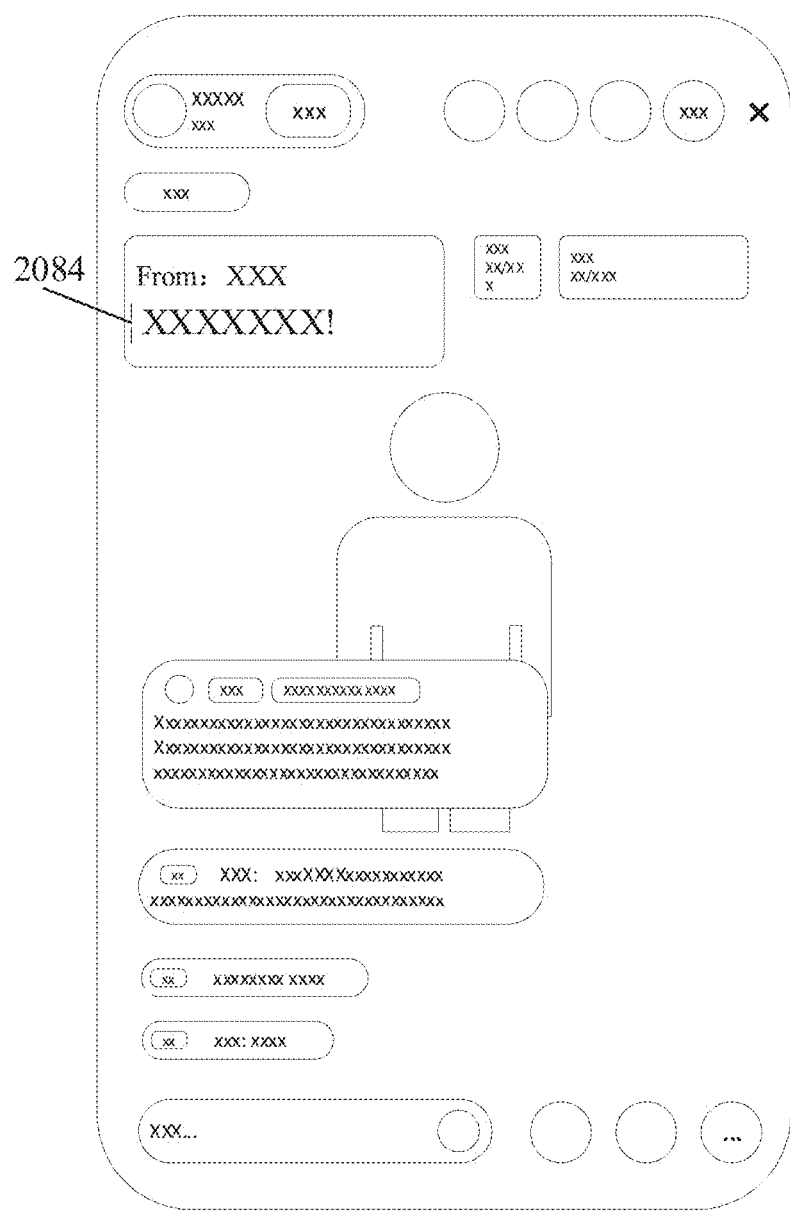

In some embodiments, as shown in FIG. 2N, due to characteristics of the question gift, after the user taps the information control 2106, the gift icon may not be displayed when the information is displayed in the window 212, thereby keeping an interface cleaner.

Next, the side of the second terminal 106 is described. Based on the previous description, the first terminal 102A sends the gift carrying the information 2084 to the user of the second terminal 106 (the live streamer in the live streaming room). On this basis, after receiving the gift, the second terminal 106 may display the gift accordingly.

Figure 3A:
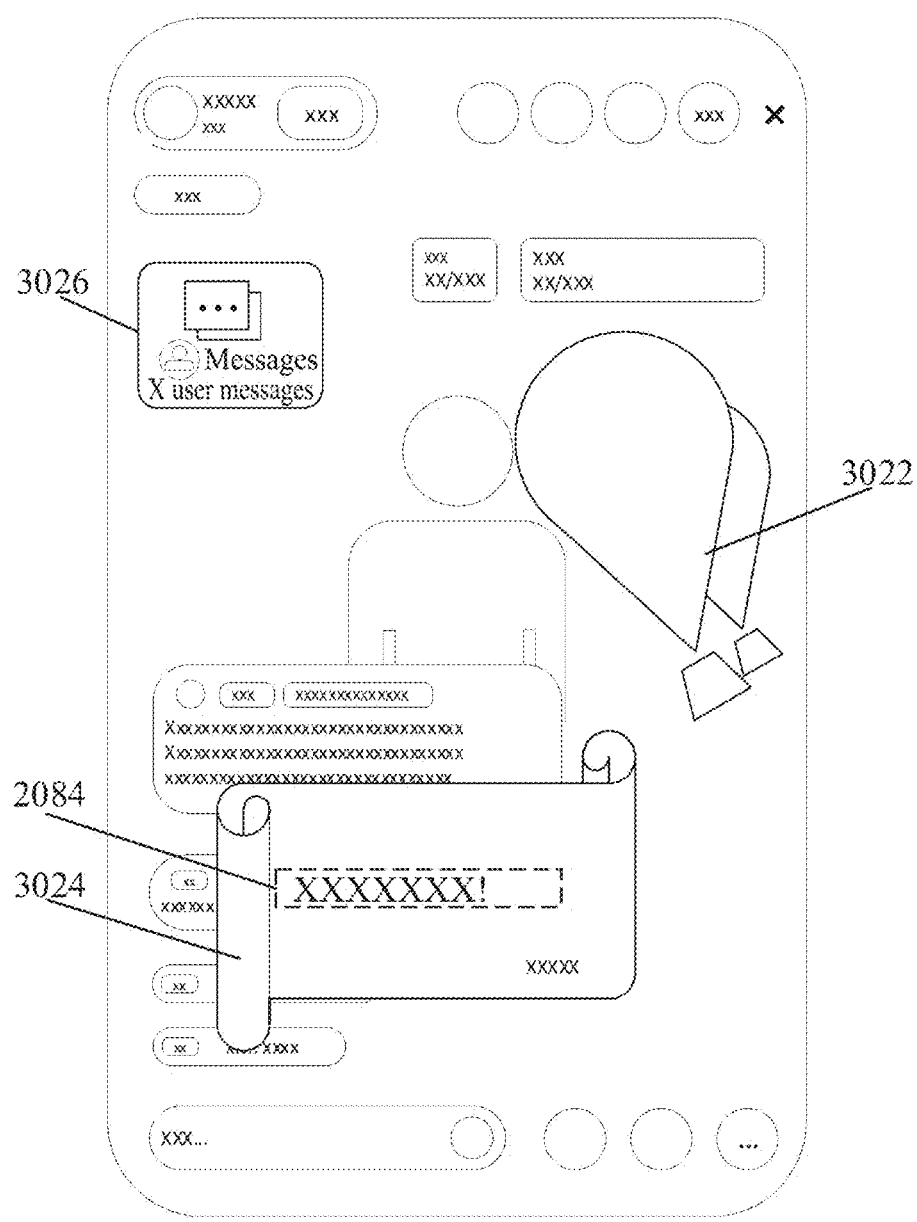
FIG. 3A is a schematic diagram of an exemplary page according to an embodiment of the present disclosure.

FIG. 3A is a schematic diagram of an exemplary page 300 according to an embodiment of the present disclosure.

As shown in FIG. 3A, after receiving a gift, the second terminal 106 may display the gift, for example, by displaying balloons through an effect 3022.

In some embodiments, when the second terminal 106 determines that the gift is associated with the information 2084 sent by the first terminal 102A, the second terminal 106 may also display an information control 3026 corresponding to the information 2084 on the page 300, as shown in FIG. 3A. In some embodiments, in addition to the information control 3026, the information 2084 may also be displayed, as shown in FIG. 3A. In some embodiments, to enhance a visual effect, an effect 3024 corresponding to the information 2084 may also be displayed on the page 300. For example, the effect 3024 may be an effect of a scroll, and the information 2084 is displayed when the scroll unfolds.

Figure 3B:
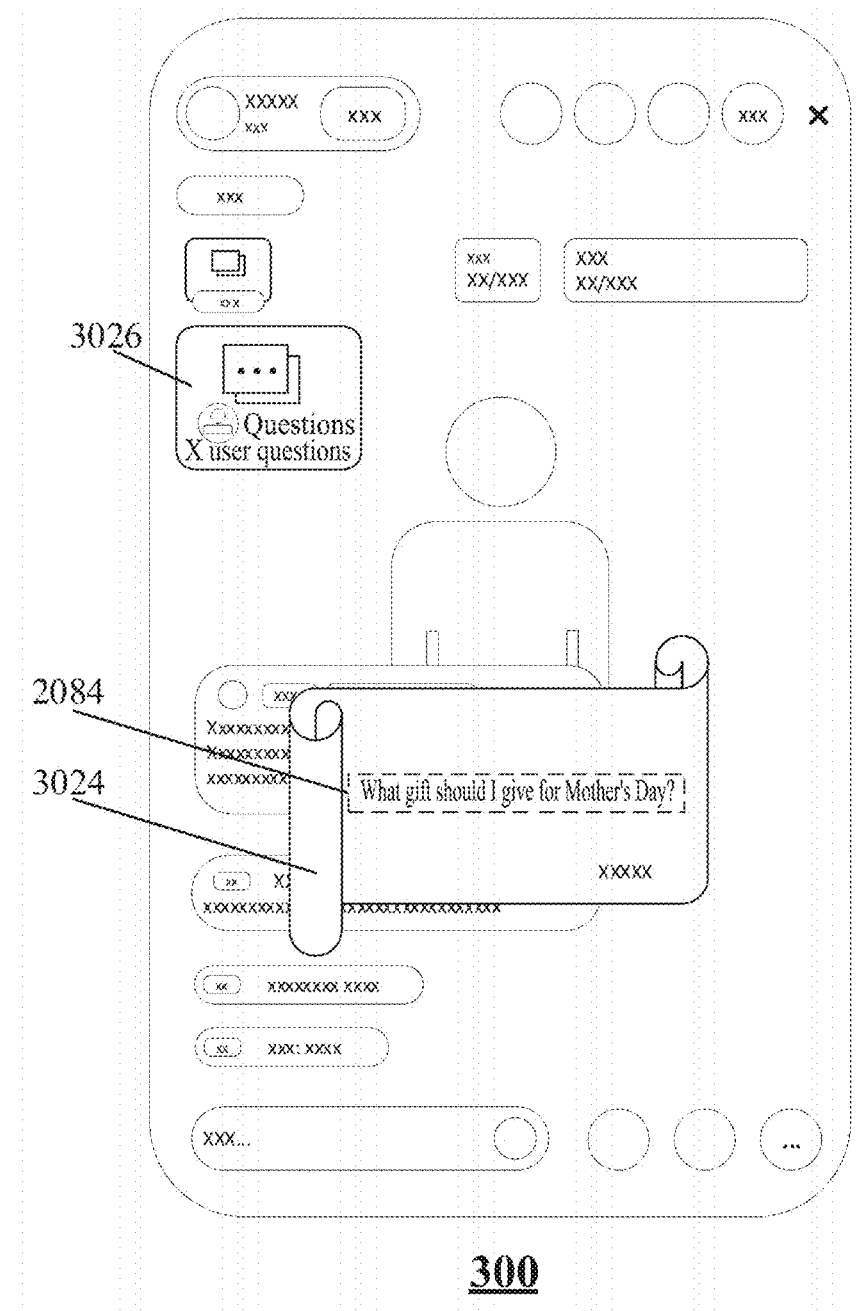
FIG. 3B is a schematic diagram of an exemplary page according to an embodiment of the present disclosure.

In some embodiments, a gift received by the second terminal 106 may be a question gift, and the gift and the information may be displayed together. FIG. 3B is a schematic diagram of another exemplary page 300 according to an embodiment of the present disclosure. As shown in FIG. 3B, an effect 3024 for a question gift is displayed on the page 300. The effect 3024 may be an effect of a scroll. A corresponding question 2084 is displayed when the scroll unfolds, thereby highlighting functionality of the question gift, providing a more distinctive visual effect, and improving the user experience.

In some embodiments, as shown in FIG. 3A, the information control 3026 may be configured to prompt the live streamer about a user leaving a message for a current gift and a total number of users leaving messages. Similarly, as shown in FIG. 3B, the information control 3026 on the page 300 may be configured to prompt the live streamer about a user who asks a question through a current gift, and the number of users who have asked questions.

In some embodiments, after receiving a gift, displaying an information control corresponding to the first information on a live streaming room page may be further divided into two cases:

The second terminal 106 may generate the information control 3026 on the page 300 if the current page 300 does not include the information control 3026; and the second terminal 106 may update the information control 3026 based on the information 2084 if the current page 300 includes the information control 3026.

For example, the information control 3026 may prompt the live streamer about a user who asks a question through a current gift, and the number of users who have asked questions. Therefore, when the information control 3026 needs to be generated, as shown in FIG. 3A or FIG. 3B, in addition to generating a general shape of the information control 3026, an avatar of the current user who asks a question and the number of users who have asked questions may also be displayed on the information control 3026.

If the information control 3026 needs to be updated, the original user avatar may be replaced with the avatar of the user corresponding to the current gift, and the original number of users who have asked questions is incremented by 1.

Therefore, by designing the information control 3026, related information is better displayed to the user (the live streamer), thereby improving the user experience.

In some embodiments, a display time of the information control 3026 may be set to be limited. For example, when the information control 3026 is generated for the first time, the second terminal 106 may perform a countdown for the display time of the information control 3026 based on a third preset time T3 (e.g., 5 min).

If the countdown ends and no new information associated with the target gift is received (i.e., no new message gift or question gift is received during this period), the second terminal 106 may close the information control 3026, thereby avoiding long-term display of the control so as not to affect the implementation of other functions.

If the countdown has not ended and new information associated with the target gift is received (i.e., a new message gift or a question gift is received during this period), the second terminal 106 may prolong the countdown by a fourth preset time T4 (e.g., 5 min). When the countdown ends and no new information associated with the target gift is received (i.e., no new message gift or question gift is received during this period), the second terminal 106 may close the information control 3026.

In some embodiments, the prolonged time for the countdown may be limited, which cannot, for example, exceed 15 min to the maximum, thereby preventing the information control 3026 from occupying the page for a long time so as not to affect the implementation of other functions.

When the information control 3026 is also displayed on the page 300, the user (the live streamer) may tap the information control 3026. In response to a trigger operation on the information control 3026, the second terminal 106 may display a window on the page 300 for displaying a list of messages or questions corresponding to message gifts or question gifts received by the user.

Figure 3C:
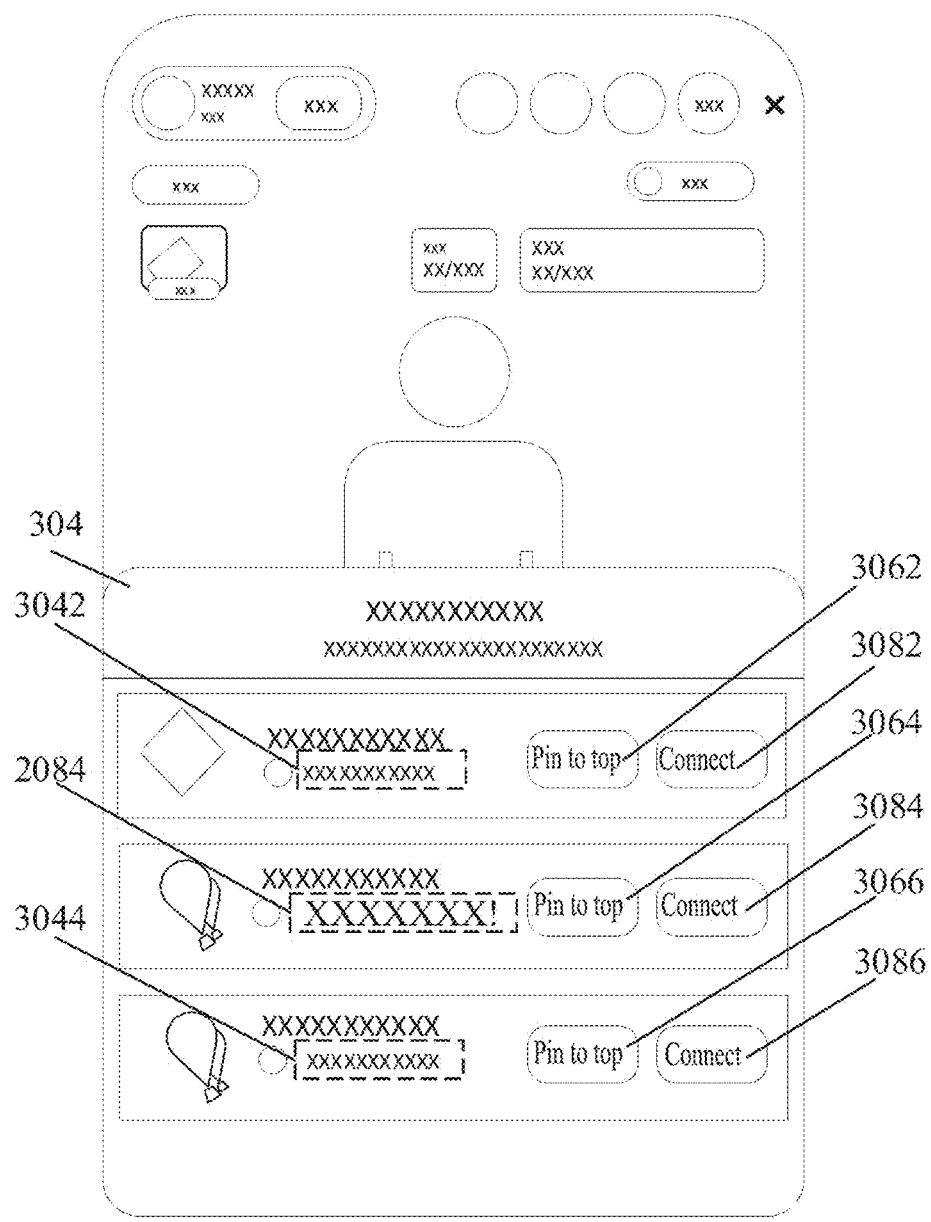
FIG. 3C is a schematic diagram of an exemplary page according to an embodiment of the present disclosure.
Figure 3D:
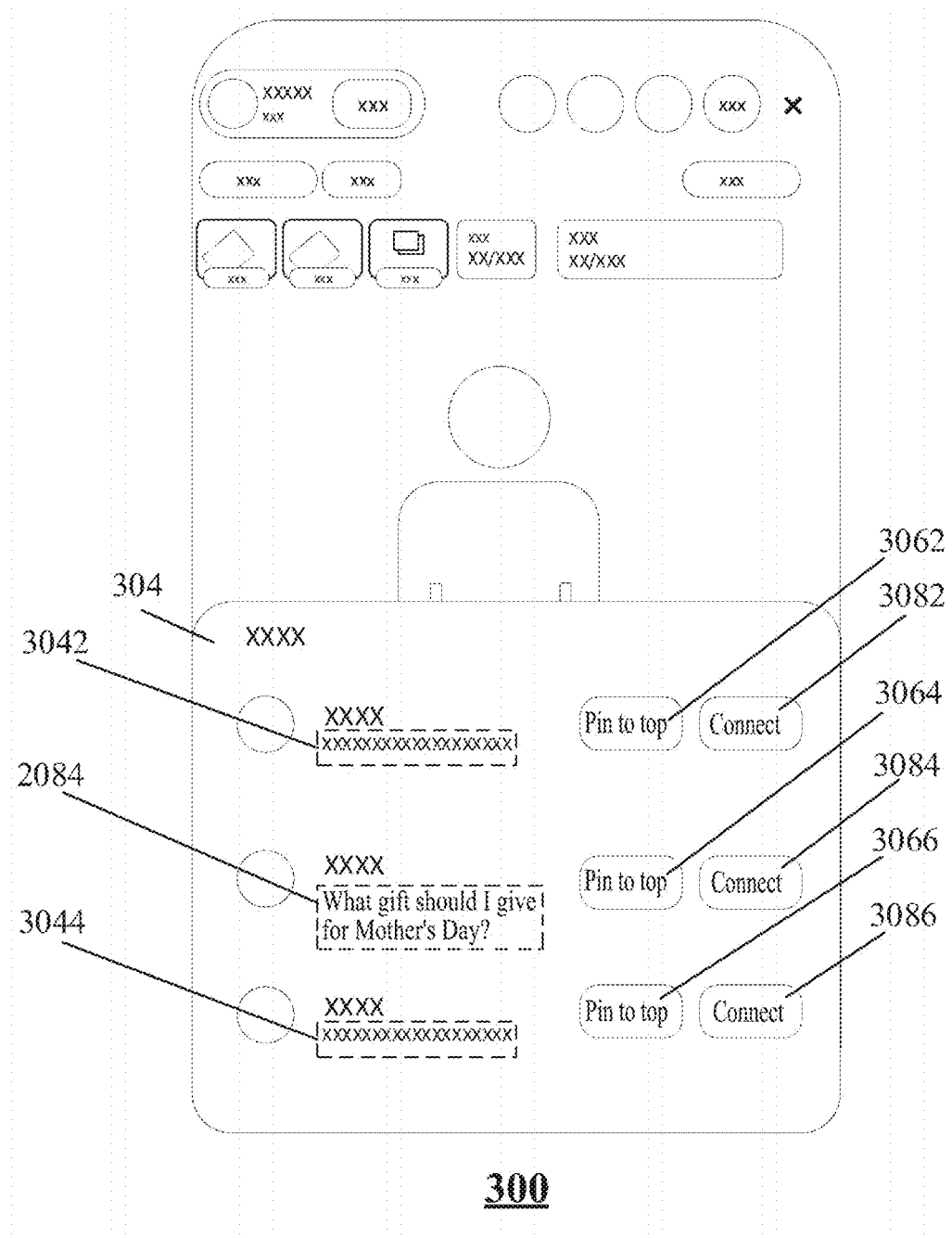
FIG. 3D is a schematic diagram of an exemplary page according to an embodiment of the present disclosure.

FIG. 3C is a schematic diagram of another exemplary page 300 according to an embodiment of the present disclosure. As shown in FIG. 3C, after receiving a trigger operation on the information control 3026, a window 304 may pop up on the page 300 of the second terminal 106. The window 304 may include the information 2084, and a plurality of pieces of other information 3042 and 3044 that are associated with a target gift (e.g., a message gift) and received within the first preset time T1. Therefore, the user may view the messages corresponding to the received message gifts by tapping the information control 3026, which is convenient for the user, and improves the user experience. In some embodiments, as shown in FIG. 3C, when the received gift is a message gift, a corresponding gift icon may also be displayed at a position corresponding to each piece of information in the window 304, thereby prompting the user about the gift corresponding to the message. As shown in FIG. 3D, when the gift is a question gift, a gift icon may not be displayed in the window 304, thereby keeping an interface cleaner.

Figure 2P:
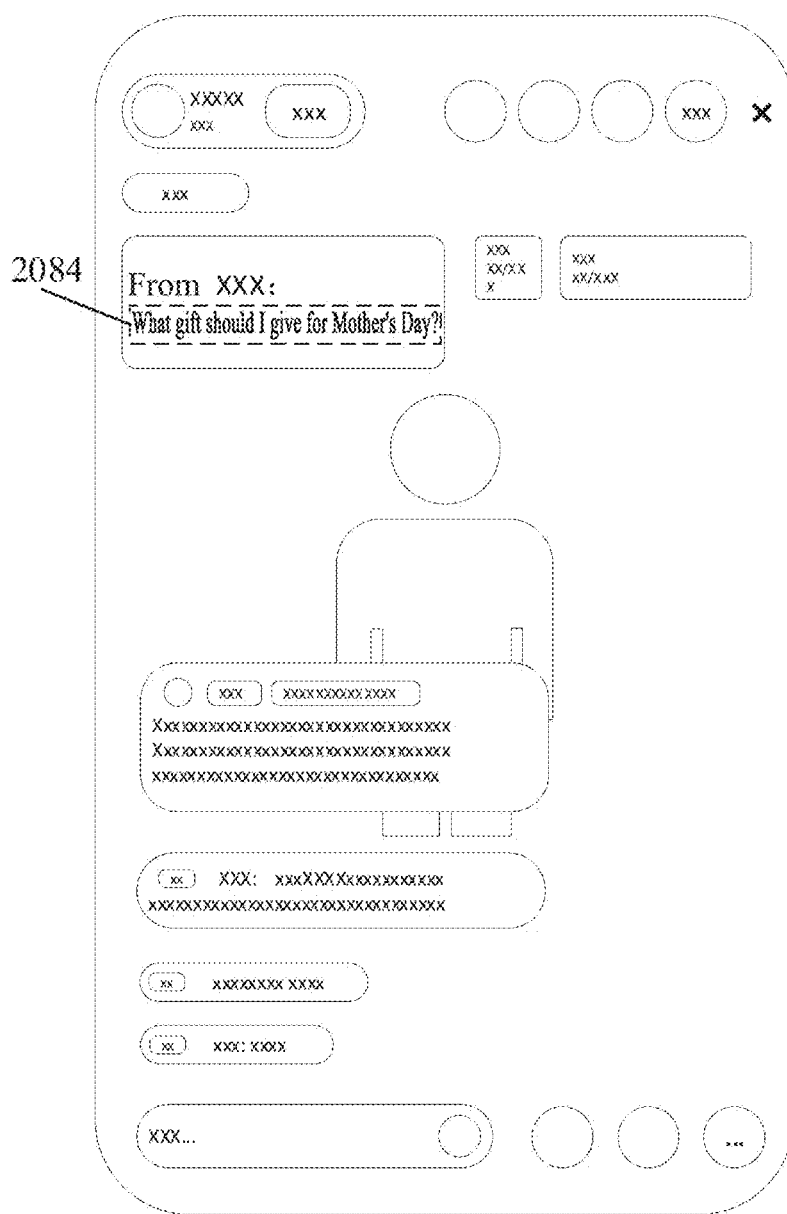
FIG. 2P is a schematic diagram of an exemplary page according to an embodiment of the present disclosure.
Figure 3E:
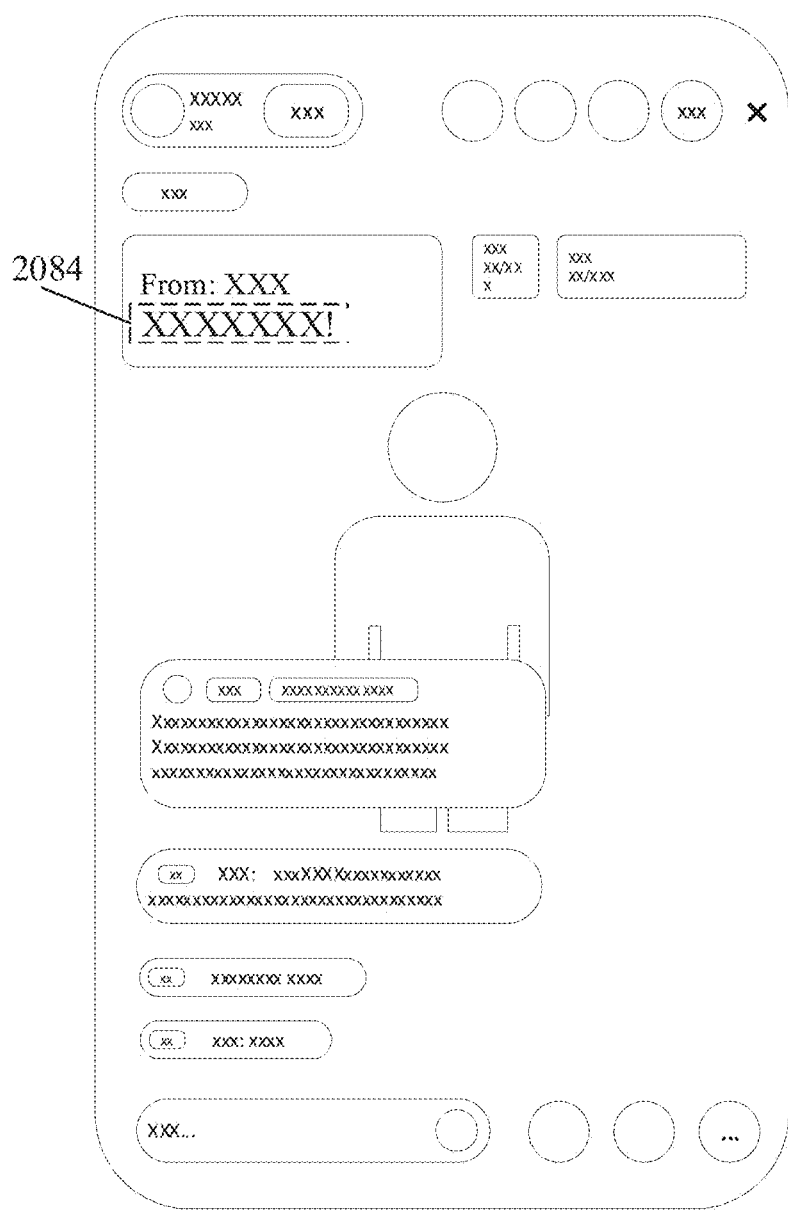
FIG. 3E is a schematic diagram of an exemplary page according to an embodiment of the present disclosure.
Figure 3F:
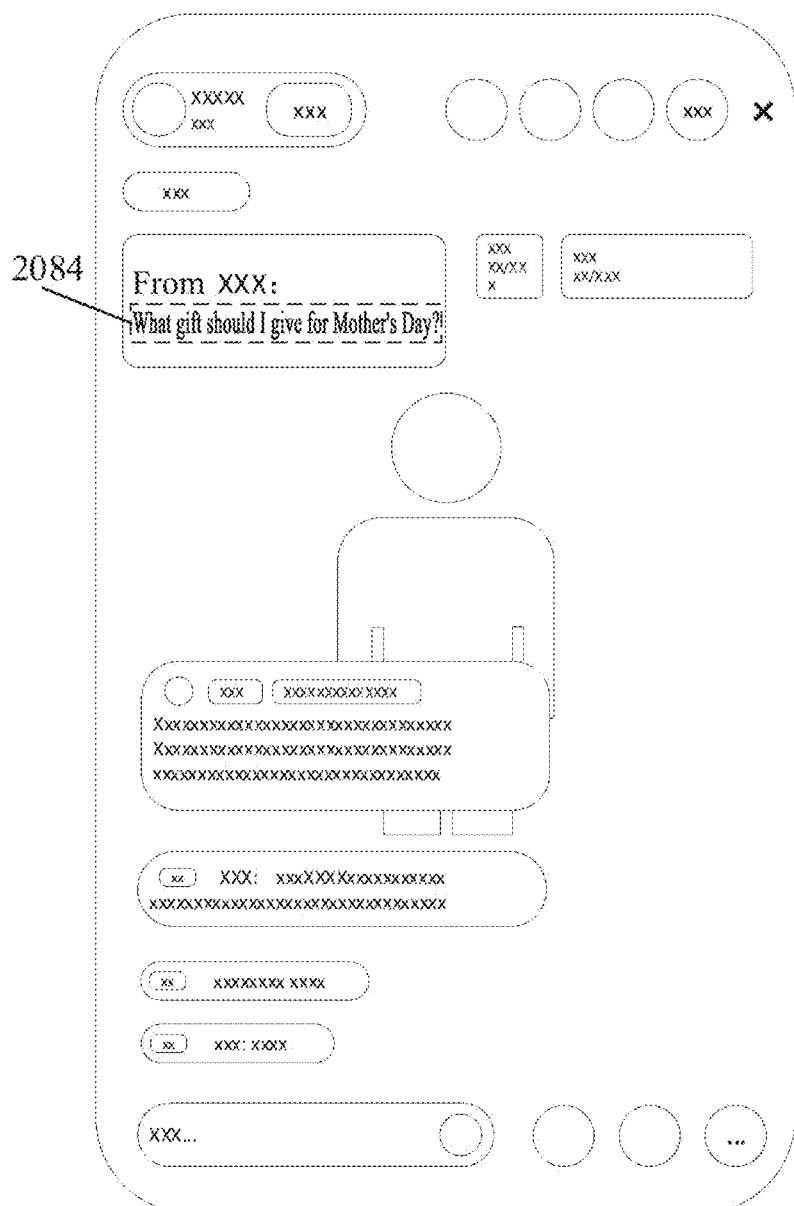
FIG. 3F is a schematic diagram of an exemplary page according to an embodiment of the present disclosure.

In some embodiments, as shown in FIG. 3C and FIG. 3D, the window 304 may further include a plurality of interactive controls 3062 to 3066 respectively corresponding to the information 2084 and the information 3042 and 3044, and the interactive controls 3062 to 3066 are configured to provide the user with entries to select the corresponding information for display in the live streaming room. Therefore, in some embodiments, for example, the user (the live streamer) taps the interactive control 3064 corresponding to the information 2084, the second terminal 106 may display, in response to a trigger operation on the target interactive control 3064, the information 2084 corresponding to the target interactive control 3064 at a target position of the page 300, such as at an upper left corner, as shown in FIG. 3E or FIG. 3F. Correspondingly, for the first terminals 102A to 102C that are viewing the current live streaming event, in response to the user (the live streamer) selecting the information 2084, the selected information 2084 may also be correspondingly displayed on the pages 200 of the first terminals 102A to 102C, as shown in FIG. 2O or FIG. 2P.

Therefore, by synchronously displaying the information 2084 on the page 200 and the page 300, the interaction between the live streamer and the audience is implemented, and the live streamer may prominently display the information that the live streamer wants the audience to see, thereby improving the product interaction performance. In particular, in a question and answer scenario, the user selects a question to be answered for display in the live streaming room, and may synchronously focus on answering the question. When viewing the live streaming event, the audience may also intuitively see the question that the live streamer is currently answering on the page 200, thereby further improving the user experience.

In some embodiments, after the selected information 2084 is displayed on the page 300, the second terminal 106 may display the information 2084 as being in a Done state (e.g., marking the information as "Done" or changing a font color of the information to gray). Then, the information 2084 is placed at the bottom of the window 304 (placed at the end of the list). The next time when the user opens the window 304, the user needs to scroll down to the bottom of the list to see the information 2084. Therefore, the information that has been handled by the user is prevented from occupying a visible area of the window 304, thereby leaving more space for pending information and also helping the user to filter the information.

In some embodiments, in response to the display time of the information 2084 at the target position on the page 300 exceeding a second preset time T2 (e.g., 10 s), the second terminal 106 may hide the information 2084, thereby preventing the information 2084 from occupying the page 300 for a long time so as not to affect the implementation of other functions. It should be understood that correspondingly, the information 2084 may also be correspondingly hidden on the pages 200 of the first terminals 102A to 102C.

Referring back to FIG. 3C or FIG. 3D, in some embodiments, the window 304 may further include a plurality of connect controls 3082 to 3086 respectively corresponding to the information 2084 and the information 3042 and 3044, thereby providing a rapid connection (interactive live streaming) mechanism between the live streamer and the audiences. Therefore, in some embodiments, the second terminal 106 may send, in response to a trigger operation on a target connect control (e.g., a control 3084), a connection invitation to a sending end (e.g., the first terminal 102A) of the information 2084 corresponding to the target connect control. Correspondingly, the first terminal 102A may receive the connection invitation and display the connection invitation (not shown in the figure) on the page 200. The page 200 may also display a corresponding control for receiving the connection invitation. When the control is triggered, the first terminal 102A and the second terminal 106 may establish a connection and start a conversation. This facilitates the rapid connection (interactive live streaming) between the live streamer and the audience.

In some embodiments, when the connection ends and the page 300 of the live streaming room reappears, the information displayed at the target position of the page 300 may be hidden. Because the connection has already been performed and the question has been answered, there is no need to display the information at the target position, which can provide a display space for other functions.

In some embodiments, if received information associated with a target gift includes pending information (e.g., the information is not selected, and a corresponding connection is not performed) when the information control 3026 is closed (e.g., the countdown ends), the pending information may be hidden in the window 304 when the information control 3026 is triggered next time and the window 304 is displayed, thereby facilitating the display of subsequent information.

From the above embodiments, it can be seen that the system 100 provided in the embodiments of the present disclosure implements attachment of information (e.g., messages or questions) when gifts are sent, and then, the information may be attached to the live streamer through the gifts, thereby enriching the interactive method for sending gifts. Further, the live streamer may also select designated information to be publicized (featured), or interact with the user through an interactive live streaming.

The system 100 provided in the embodiments of the present disclosure enhances the gift-based interactive capability in the live streaming room, allows the live streamer to select interactive information based on actual needs, and enriches the live streaming content.

Figure 4:
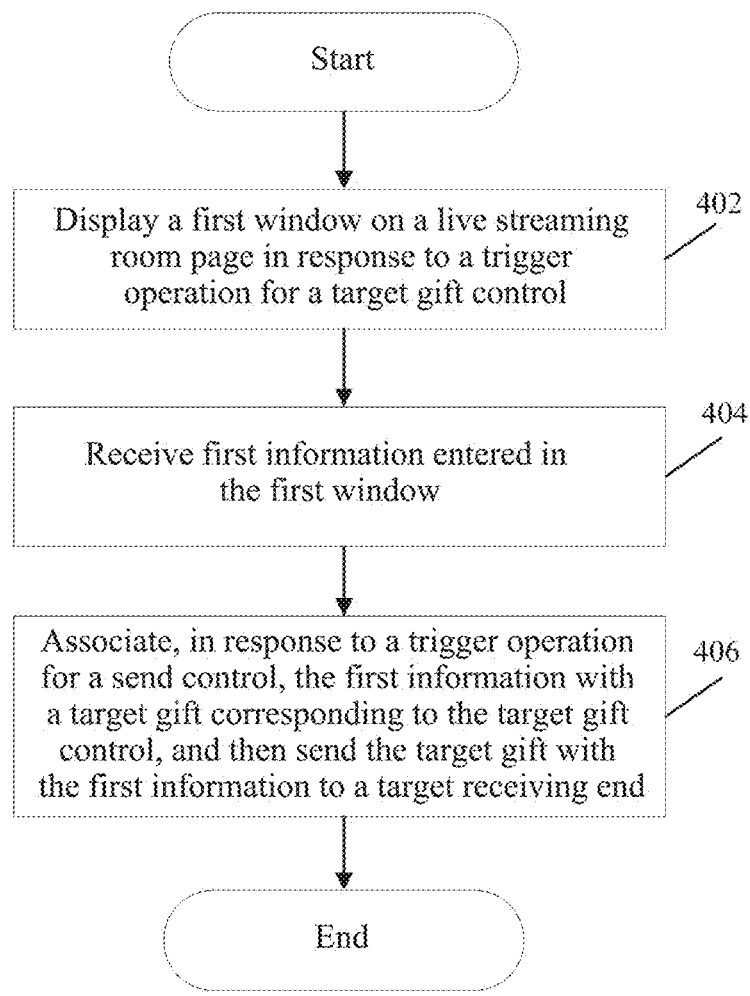
FIG. 4 is a schematic flowchart of an exemplary method according to an embodiment of the present disclosure.

The embodiments of the present disclosure further provide a method for sending a gift in a live streaming room. FIG. 4 is a schematic flowchart of an exemplary method 400 according to an embodiment of the present disclosure. As shown in FIG. 4, the method 400 may be applied to the first terminals 102A to 102C in FIG. 1, and may further include the following steps.

Step 402: Display a first window (e.g., the window 206 in FIG. 2D) on a live streaming room page (e.g., the page 200 in FIG. 2B) in response to a trigger operation on a target gift control (e.g., the control 2042).

Step 404: Receive first information (e.g., the information 2084 in FIG. 2E) entered in the first window.

Step 406: Associate, in response to a trigger operation on a send control (e.g., the control 2066 in FIG. 2F), the first information with a target gift corresponding to the target gift control, and then send the target gift with the first information to a target receiving end (e.g., the second terminal 106 in FIG. 1).

Compared with a related pure gift interaction mode or a related pure public chat comment mode, the method for sending a gift in a live streaming room provided in the embodiments of the present disclosure may allow adding information (e.g., a message or a question) to the gift and sending the gift carrying the information. Through the ingenious combination of the gift and the message, the receiving end may display the information when receiving the gift, thereby improving the interaction efficiency, enriching the function of gift sending in the live streaming room, and improving product interaction performance.

In some embodiments, the method 400 may further include: ceasing display of the first window in response to a trigger operation on the send control, and displaying an effect (e.g., the effect 2102 in FIG. 2G) corresponding to the target gift on the live streaming room page.

In some embodiments, the method 400 may further include: displaying an information control (e.g., the control 2106 in FIG. 2H) corresponding to the first information on the live streaming room page; and displaying a second window (e.g., the window 212 in FIG. 2I) on the live streaming room page in response to a trigger operation on the information control, where the second window includes the first information (e.g., the information 2084 in FIG. 2I), and a plurality of pieces of second information (e.g., the information 2122 and 2124 in FIG. 2J) that are associated with the target gift and received by the target receiving end within a first preset time, and the second information comes from other sending ends (e.g., the first terminals 102B and 102C in FIG. 1) interacting with the target receiving end. Therefore, the information associated with the gift is displayed for the reference of a user.

In some embodiments, the method 400 may further include: displaying first information or second information (e.g., the information 2084 in FIG. 2N or FIG. 2O) selected by the target receiving end on the live streaming room page, thereby displaying the information that the live streamer wants the audience to see on an audience side, and enriching the interactive function.

In some embodiments, before the step of displaying a first window on a live streaming room page in response to a trigger operation on a target gift control, the method 400 may further include: displaying a gift identifier (e.g., the control 202 in FIG. 2A) on the live streaming room page (e.g., the page 200 in FIG. 2A); and displaying, in response to a trigger operation for the gift identifier, a third window (e.g., the window 204 in FIG. 2B) on the live streaming room page when the live streaming room satisfies a preset filtering rule, where the third window includes the target gift control. Therefore, by filtering the live streaming room based on the preset filtering rule, functions provided by the present disclosure are more targeted, and a use effect and user experience are better. The gift identifier may be a gift aggregated entry, the third window may be a gift panel for displaying a plurality of gift controls, and the target gift control may be one of the plurality of gift controls.

In some embodiments, the associating, in response to a trigger operation on a send control, the first information with a target gift corresponding to the target gift control, and then sending the target gift with the first information to a target receiving end further includes: displaying a fourth window on the live streaming room page in response to the trigger operation on the send control, where the fourth window includes a resource exchange entry; and associating, in response to completing a resource transfer operation for the resource exchange entry, the first information and the target gift corresponding to the target gift control and then sending the target gift with the first information to the target receiving end.

In some embodiments, the associating, in response to a trigger operation on a send control, the first information with a target gift corresponding to the target gift control, and then sending the target gift with the first information to a target receiving end further includes: displaying a fifth window (e.g., the window 214 in FIG. 2G) on the live streaming room page in response to the trigger operation on the send control, where the fifth window includes a plurality of candidate gifts; and associating, in response to a trigger operation for a target candidate gift from the plurality of candidate gifts, the first information with the target candidate gift, and then sending the target candidate gift with the first information to the target receiving end. Gift selections are enriched for the user by providing the plurality of candidate gifts.

It should be noted that the method in the embodiments of the present disclosure may be performed by a single device, such as a computer or a server. The method in the embodiments may also be applied to a distributed scenario to be completed through cooperation of a plurality of devices. In the distributed scenario, one of the plurality of devices may only perform one or more steps of the method in the embodiments of the present disclosure. The plurality of devices interact with each other to complete the method.

It should be noted that some embodiments of the present disclosure are described above. Other embodiments are within the scope of the appended claims. In some cases, the actions or steps recited in the claims can be performed in an order different from that in the above embodiments, and can still achieve desired results. In addition, the processes depicted in the accompanying drawings are not necessarily required to be shown in a particular or sequential order, to achieve desired results. In some implementations, multi-task processing and parallel processing are also possible or may be advantageous.

Figure 5:
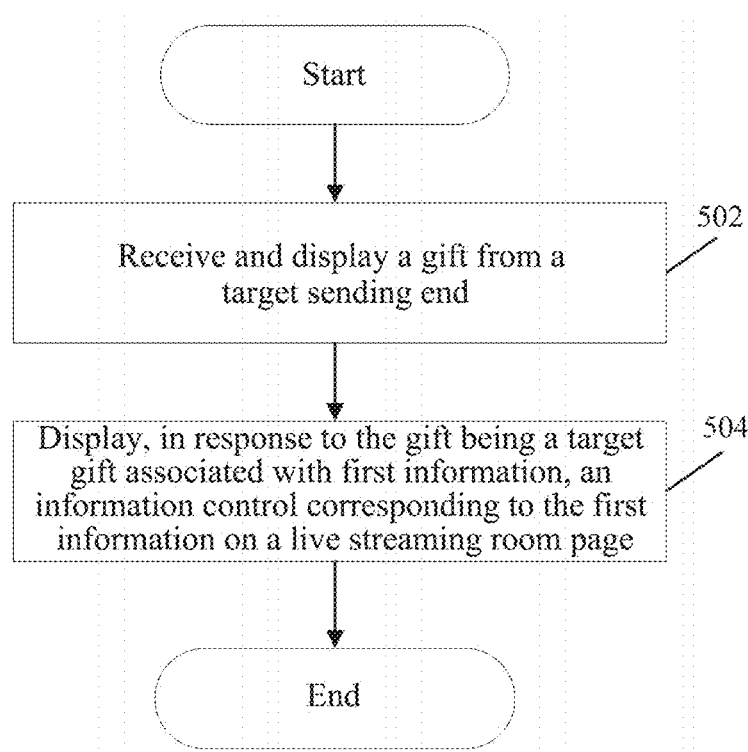
FIG. 5 is a schematic flowchart of another exemplary method according to an embodiment of the present disclosure.

The embodiments of the present disclosure further provide a method for displaying a gift in a live streaming room. FIG. 5 is a schematic flowchart of another exemplary method 500 according to an embodiment of the present disclosure. As shown in FIG. 5, the method 500 may be implemented by the second terminal 106 in FIG. 1, and may further include the following steps.

Step 502: Receive and display a gift (e.g., the gift effect 3022 in FIG. 3A) from a target sending end (e.g., the first terminal 102A in FIG. 1).

Step 504: Display, in response to the gift being a target gift associated with first information, an information control (e.g., the control 3026 in FIG. 3A) corresponding to the first information (e.g., the information 2084 in FIG. 3A) on a live streaming room page (e.g., the page 300 in FIG. 3A).

According to the method for displaying a gift in a live streaming room provided by the embodiments of the present disclosure, the corresponding information control may be displayed when the gift includes information (e.g., a message or a question) so as to prompt the user that the gift carrying the information is received, thereby enriching the function of displaying gifts in the live streaming room and improving the product interaction performance.

In some embodiments, the method 500 may further include: displaying a first window (e.g., the window 304 in FIG. 3C) on the live streaming room page in response to a trigger operation on the information control, where the first window includes the first information (e.g., the information 2084 in FIG. 3C), and a plurality of pieces of second information (e.g., the information 3042 and 3044 in FIG. 3C) that are associated with a target gift and received within a first preset time, the first information includes information entered from the target sending end, and the second information comes from other sending ends (e.g., the first terminals 102B and 102C in FIG. 1) other than the target sending end. Therefore, the information associated with the gift is displayed for the reference of a user.

In some embodiments, the first window further includes a plurality of interactive controls (e.g., the controls 3062 to 3066 in FIG. 3C) respectively corresponding to the first information and the second information. The method 500 may further include: displaying, in response to a trigger operation on a target interactive control from the plurality of interactive controls, first information or second information corresponding to the target interactive control at a target position of the live streaming room page, as shown in FIG. 3E or FIG. 3F, thereby enriching the interactive function.

In some embodiments, the method 500 may further include: displaying, in the first window, the first information or the second information corresponding to the target interactive control as being in a Done state; and placing the first information or the second information corresponding to the target interactive control at the bottom of the first window, thereby leaving a display space for other information.

In some embodiments, the method 500 may further include: hiding the first information or the second information corresponding to the target interactive control in response to a display time of the first information or the second information corresponding to the target interactive control at the target position of the live streaming room page exceeding a second preset time, thereby leaving a display space on the page for other functions to use.

In some embodiments, the first window further includes a plurality of connect controls respectively corresponding to the first information and the second information. The method 500 may further include: sending, in response to a trigger operation on a target connect control from the plurality of connect controls, a connection invitation to a sending end of first information or second information corresponding to the target connect control, thereby conveniently establishing a connection and improving the user experience.

In some embodiments, the displaying an information control corresponding to the first information on a live streaming room page further includes: generating an information control corresponding to the first information on the live streaming room page in response to the live streaming room page not including an information control; or updating, in response to the live streaming room page including an information control, the information control based on the first information.

In some embodiments, the generating an information control corresponding to the first information on the live streaming room page further includes: performing a countdown for a display time of the information control based on a third preset time. The method 500 may further include: closing the information control in response to the countdown ending and no new information associated with the target gift being received; or prolonging the countdown by a fourth preset time in response to the third preset time having not elapsed for the countdown and new information associated with the target gift being received. Therefore, the information control may be prevented from occupying too much space on the page, thereby not affecting the implementation of other functions.

In some embodiments, the method 500 may further include: hiding, in response to received information associated with the target gift including pending information when the information control is closed, the pending information in the first window when the information control is triggered next time and the first window is displayed, thereby optimizing the performance and improving the user experience.

It should be noted that the method in the embodiments of the present disclosure may be performed by a single device, such as a computer or a server. The method in the embodiments may also be applied to a distributed scenario to be completed through cooperation of a plurality of devices. In the distributed scenario, one of the plurality of devices may only perform one or more steps of the method in the embodiments of the present disclosure. The plurality of devices interact with each other to complete the method.

It should be noted that some embodiments of the present disclosure are described above. Other embodiments are within the scope of the appended claims. In some cases, the actions or steps recited in the claims can be performed in an order different from that in the above embodiments, and can still achieve desired results. In addition, the processes depicted in the accompanying drawings are not necessarily required to be shown in a particular or sequential order, to achieve desired results. In some implementations, multi-task processing and parallel processing are also possible or may be advantageous.

Figure 6:
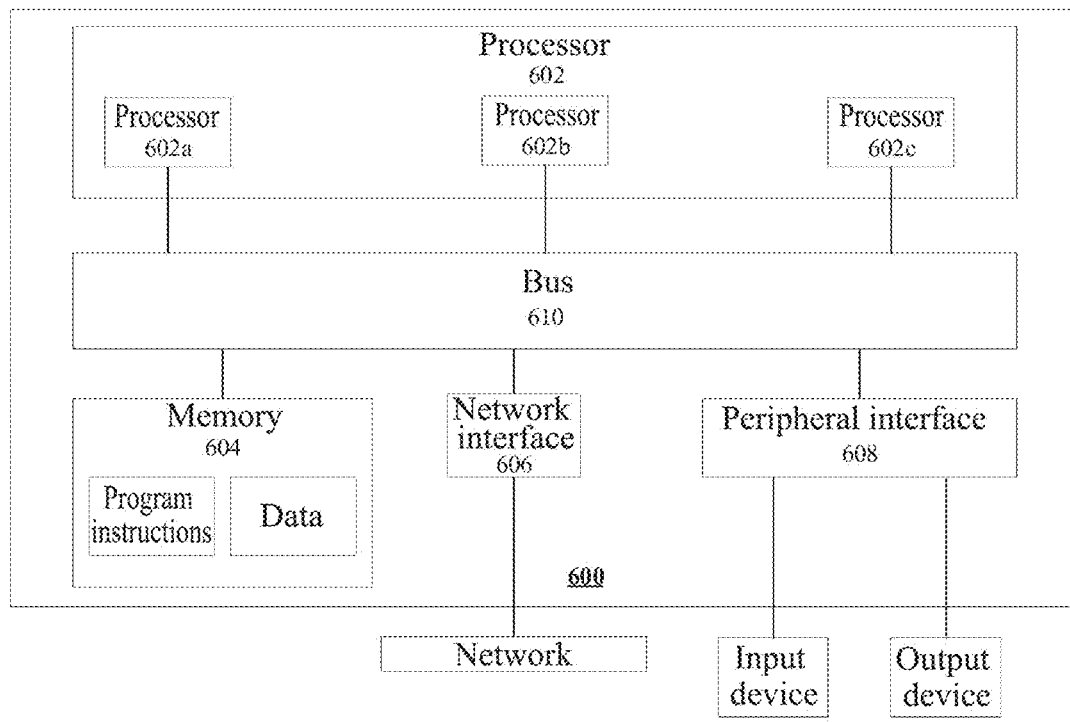
FIG. 6 is a schematic diagram of a hardware structure of an exemplary computer device according to an embodiment of the present disclosure.

The embodiments of the present disclosure further provide a computer device, configured to implement the above method 400 or 500. FIG. 6 is a schematic diagram of a hardware structure of an exemplary computer device 600 according to an embodiment of the present disclosure. The computer device 600 may be configured to implement the first terminals 102A to 102C in FIG. 1, or may also be configured to implement the second terminal 106 in FIG. 1. In some scenarios, the computer device 600 may also be configured to implement the server 104 in FIG. 1.

As shown in FIG. 6, the computer device 600 may include: a processor 602, a memory 604, a network module 606, a peripheral interface 608, and a bus 610. The processor 602, the memory 604, the network module 606, and the peripheral interface 608 are communicatively connected to each other within the computer device 600 through the bus 610.

The processor 602 may be a central processing unit (CPU), an image processor, a neural processing unit (NPU), a microcontroller unit (MCU), a programmable logic device, a digital signal processor (DSP), an application specific integrated circuit (ASIC), or one or more integrated circuits. The processor 602 may be configured to perform functions related to the technology described in the present disclosure. In some embodiments, the processor 602 may further include a plurality of processors integrated into a single logical component. For example, as shown in FIG. 6, the processor 602 may include a plurality of processors 602*a*, 602*b*, and 602*c*.

The memory 604 may be configured to store data (e.g., instructions and computer code). As shown in FIG. 6, the data stored in the memory 604 may include program instructions (e.g., program instructions for implementing a frame rate detection method in the embodiments of the present disclosure) and data to be processed (e.g., the memory may store configuration files for other modules). The processor 602 may also access the program instructions and the data stored in the memory 604 and execute the program instructions to operate the data to be processed. The memory 604 may include a volatile storage apparatus or a non-volatile storage apparatus. In some embodiments, the memory 604 may include a random access memory (RAM), a read-only memory (ROM), an optical disk, a magnetic disk, a hard drive, a solid state drive (SSD), a flash memory, a memory stick, etc.

The network interface 606 may be configured to provide communication between the computer device 600 and other external devices via a network. The network may be any wired or wireless network capable of transmitting and receiving data. For example, the network may be a wired network, a local wireless network (e.g., Bluetooth, WiFi, and near field communication (NFC)), a cellular network, the Internet, or a combination of the above. It should be understood that the type of network is not limited to the above specific examples.

The peripheral interface 608 may be configured to connect the computer device 600 with one or more peripheral apparatuses to achieve information input and output. For example, the peripheral apparatus may include an input device such as a keyboard, a mouse, a touchpad, a touchscreen, a microphone, and various sensors, and an output device such as a display, a speaker, a vibrator, and an indicator light.

The bus 610 may be configured to transmit information between various components of the computer device 600 (e.g., the processor 602, the memory 604, the network interface 606, and the peripheral interface 608), such as an internal bus (e.g., a processor-memory bus) and an external bus (a USB port and a PCI-E bus).

It should be noted that although only the processor 602, the memory 604, the network interface 606, the peripheral interface 608, and the bus 610 are shown in the architecture of the above computer device 600, during a specific implementation, the architecture of the computer device 600 may further include other components necessary for normal operation. In addition, those skilled in the art should understand that the architecture of the above computer device 600 may include only components necessary for implementing the solutions of the embodiments of the present disclosure, and does not necessarily include all the components shown in the figures.

Figure 7:
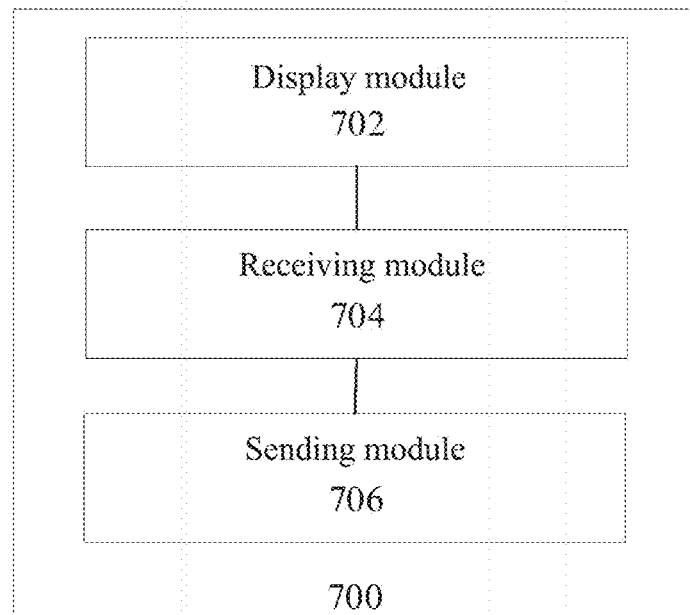
FIG. 7 is a schematic diagram of an exemplary apparatus according to an embodiment of the present disclosure.

The embodiments of the present disclosure further provide an apparatus for sending a gift in a live streaming room. FIG. 7 is a schematic diagram of an exemplary apparatus 700 according to an embodiment of the present disclosure. The apparatus 700 may include the following structures.

A display module 702 is configured to: display a first window on a live streaming room page in response to a trigger operation on a target gift control.

A receiving module 704 is configured to: receive first information entered in the first window.

A sending module 706 is configured to: associate, in response to a trigger operation on a send control, the first information with a target gift corresponding to the target gift control, and then send the target gift with the first information to a target receiving end.

In some embodiments, the display module 702 is configured to: cease display of the first window in response to the trigger operation on the send control, and display an effect corresponding to the target gift on the live streaming room page.

In some embodiments, the display module 702 is configured to: display an information control corresponding to the first information on the live streaming room page; and display a second window on the live streaming room page in response to a trigger operation on the information control, where the second window includes the first information, and a plurality of pieces of second information that are associated with the target gift and received by the target receiving end within a first preset time.

In some embodiments, the display module 702 is configured to: display first information or second information selected by the target receiving end on the live streaming room page.

In some embodiments, the display module 702 is configured to: display a gift identifier on the live streaming room page; and display, in response to a trigger operation for the gift identifier, a third window on the live streaming room page when the live streaming room satisfies a preset filtering rule, where the third window includes the target gift control.

In some embodiments, the display module 702 is configured to: display a fourth window on the live streaming room page in response to the trigger operation on the send control, where the fourth window includes a resource exchange entry; and associate, in response to completing a resource transfer operation for the resource exchange entry, the first information and the target gift corresponding to the target gift control and then send the target gift with the first information to the target receiving end.

In some embodiments, the display module 702 is configured to: display a fifth window on the live streaming room page in response to the trigger operation on the send control, where the fifth window includes a plurality of candidate gifts; and associate, in response to a trigger operation for a target candidate gift from the plurality of candidate gifts, the first information with the target candidate gift, and then send the target candidate gift with the first information to the target receiving end.

For ease of description, when described, the above apparatus is divided into various modules based on functions. Certainly, functions of the modules may be implemented in one or more pieces of software and/or hardware when the present disclosure is implemented.

The apparatus in the above embodiment is configured to implement the corresponding method 400 in any one of the above embodiments, and has the beneficial effects of the corresponding method embodiment, which are not repeated herein.

Figure 8:
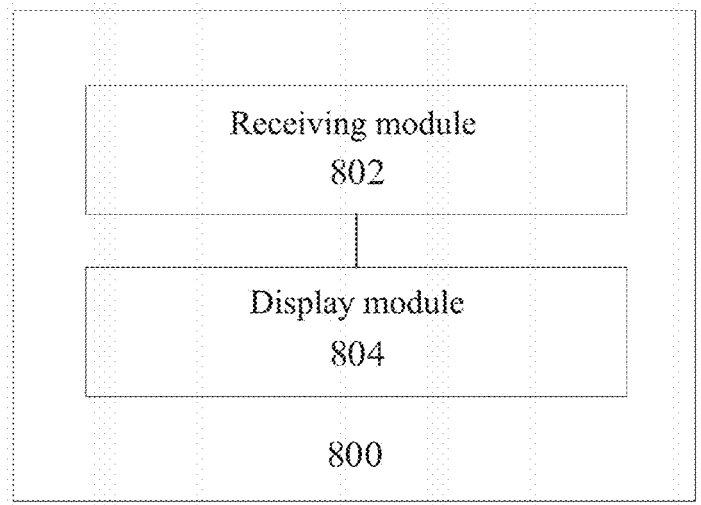
FIG. 8 is a schematic diagram of another exemplary apparatus according to an embodiment of the present disclosure.

The embodiments of the present disclosure further provide an apparatus for displaying a gift in a live streaming room. FIG. 8 is a schematic diagram of an exemplary apparatus 800 according to an embodiment of the present disclosure. The apparatus 800 may include the following structures.

A receiving module 802 is configured to: receive and display a gift from a target sending end; and a display module 804 is configured to: display the gift, and display, in response to the gift being a target gift associated with first information, an information control corresponding to the first information on a live streaming room page.

In some embodiments, the display module 804 is configured to: display a first window on the live streaming room page in response to a trigger operation on the information control, where the first window includes the first information, and a plurality of pieces of second information that are associated with the target gift and received within a first preset time, the first information includes information entered from the target sending end, and the second information comes from other sending ends other than the target sending end.

In some embodiments, the first window further includes a plurality of interactive controls respectively corresponding to the first information and the second information. The display module 804 is configured to: display, in response to a trigger operation on a target interactive control from the plurality of interactive controls, first information or second information corresponding to the target interactive control at a target position of the live streaming room page.

In some embodiments, the display module 804 is configured to: display, in the first window, the first information or the second information corresponding to the target interactive control as being in a Done state; and place the first information or the second information corresponding to the target interactive control at the bottom of the first window.

In some embodiments, the display module 804 is configured to: hide the first information or the second information corresponding to the target interactive control in response to a display time of the first information or the second information corresponding to the target interactive control at the target position of the live streaming room page exceeding a second preset time.

In some embodiments, the first window further includes a plurality of connect controls respectively corresponding to the first information and the second information. The apparatus 800 further includes a sending module (not shown in the figure), configured to: send, in response to a trigger operation on a target connect control from the plurality of connect controls, a connection invitation to a sending end of first information or second information corresponding to the target connect control.

In some embodiments, the display module 804 is configured to: generate an information control corresponding to the first information on the live streaming room page in response to the live streaming room page not including an information control; or update, in response to the live streaming room page including an information control, the information control based on the first information.

In some embodiments, the display module 804 is configured to: perform a countdown for a display time of the information control based on a third preset time; and close the information control in response to the countdown ending and no new information associated with the target gift being received; or prolong the countdown by a fourth preset time in response to the third preset time having not elapsed for the countdown and new information associated with the target gift being received.

In some embodiments, the display module 804 is configured to: hide, in response to received information associated with the target gift including pending information when the information control is closed, the pending information in the first window when the information control is triggered next time and the first window is displayed.

For ease of description, when described, the above apparatus is divided into various modules based on functions. Certainly, functions of the modules may be implemented in one or more pieces of software and/or hardware when the present disclosure is implemented.

The apparatus in the above embodiment is configured to implement the corresponding method 500 in any one of the above embodiments, and has the beneficial effects of the corresponding method embodiment, which are not repeated herein.

Based on the same inventive concept, corresponding to the method of any one of the above embodiments, the present disclosure further provides a non-transitory computer-readable storage medium storing computer instructions, where the computer instructions are used to cause the computer to perform the method 400 or 500 of any one of the above embodiments.

The computer-readable medium in this embodiment includes permanent and non-permanent, removable and non-removable media and may implement information storage by using any method or technology. Information may be computer-readable instructions, data structures, modules of a program, or other data. Examples of the computer storage medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, or any other non-transmission media that may be configured to store information capable of being accessed by a computing device.

The computer instructions stored on the storage medium in the above embodiment are used to cause the computer to perform the method 400 or 500 in any one of the above embodiments, and have the beneficial effects of the corresponding method embodiment, which are not repeated herein.

Based on the same inventive concept, corresponding to the method 400 or 500 in any one of the above embodiments, the present disclosure further provides a computer program product including a computer program. In some embodiments, the computer program may be executed by one or more processors to cause the processor to perform the method 400 or 500. Corresponding to execution bodies corresponding to the various steps in the various embodiments of the method 400 or 500, the processor that performs the corresponding step may belong to the corresponding execution body.

The computer program product in the above embodiment is used to cause the processor to perform the method 400 or 500 in any one of the above embodiments, and has the beneficial effects of the corresponding method embodiment, which are not repeated herein.

It should be understood by those of ordinary skill in the art that the discussion of any one of the above embodiments is merely exemplary, and is not intended to imply that the scope of the present disclosure (including the claims) is limited to these examples; and with the concept of the present disclosure, the technical features in the above embodiments or different embodiments may also be combined, steps may be implemented in any order, and many other changes may be made to different aspects of the embodiments of the present disclosure as described above and are not provided in detail for simplicity.

In addition, to simplify description and discussion and avoid obscuring an understanding of the embodiments of the present disclosure, well-known power/ground connections to an integrated circuit (IC) chip and other components may or may not be shown in the accompanying drawings that are provided. Furthermore, the apparatus may be shown in the form of a block diagram to avoid obscuring an understanding of the embodiments of the present disclosure, and the following fact is also taken into account: details regarding the implementation of the apparatus in the form of block diagram are highly dependent upon a platform on which the embodiments of the present disclosure are to be implemented (i.e., such details should be fully understood by those skilled in the art). Where the specific details (e.g., circuitry) are set forth to describe the exemplary embodiments of the present disclosure, it will be apparent to those skilled in the art that the embodiments of the present disclosure may be implemented without these specific details or with variations to these specific details. These descriptions should therefore be considered illustrative rather than limiting.

Although the present disclosure has been described with reference to the specific embodiments of the present disclosure, many substitutions, modifications, and variations of these embodiments will be apparent to those of ordinary skill in the art from the above description. For example, the discussed embodiments may be used for other memory architectures (e.g., a dynamic RAM (DRAM)).

The embodiments of the present disclosure are intended to cover all such substitutions, modifications, and variations that fall within the broad scope of the appended claims. Therefore, any omissions, modifications, equivalent substitutions, improvements etc. made within the spirit and principle of the embodiments of the present disclosure are intended to be included within the scope of protection of the present disclosure.

What is claimed is:

1. A method for sending a gift, comprising:
   displaying a first window on a live streaming page in response to a trigger operation on a target gift control;
   receiving first information input in the first window; and
   in response to a gift sending request, sending a target gift corresponding to the target gift control and the first information; and
   ceasing display of the first window, and displaying an effect corresponding to the target gift on the live streaming page.

2. The method according to claim 1, further comprising:
   before sending the target gift and the first information, associating, in response to the gift sending request, the first information with the target gift;
   wherein the gift sending request is sent in response to a trigger operation on a send control.

3. The method according to claim 1, further comprising:
   displaying an information control corresponding to the first information on the live streaming page; and
   displaying a second window on the live streaming page in response to a trigger operation on the information control, wherein the second window comprises the first information, and a plurality of pieces of second information that are associated with the target gift and received by the target receiving client within a first preset time, and the second information comes from other sending clients interacting with the target receiving client.

4. The method according to claim 3, further comprising:
   displaying first information or second information selected by the target receiving client on the live streaming page.

5. The method according to claim 1, further comprising:
   displaying a gift identifier on the live streaming page; and
   displaying, in response to a trigger operation on the gift identifier, a third window on the live streaming page, and displaying the target gift control in the third window when the live streaming room satisfies a preset filtering strategy.

6. The method according to claim 1, wherein sending the target gift and the first information to a target receiving client further comprises:
   displaying a fourth window on the live streaming page in response to the trigger operation on the send control, wherein the fourth window comprises a resource exchange entry; and
   associating, in response to completing a resource transfer operation on the resource exchange entry, the first information and the target gift corresponding to the target gift control, and then sending the target gift with the first information to the target receiving client.

7. The method according to claim 1, wherein the associating, in response to a trigger operation on a send control, the first information with a target gift corresponding to the target gift control, and then sending the target gift with the first information to a target receiving client further comprises:
   displaying a fifth window on the live streaming page in response to the trigger operation on the send control, wherein the fifth window comprises a plurality of candidate gifts; and
   associating, in response to a trigger operation for a target candidate gift from the plurality of candidate gifts, the first information with the target candidate gift, and then sending the target candidate gift with the first information to the target receiving client.

8. A method for displaying a gift in a live streaming room, comprising:
   receiving and displaying a gift from a target sending client; and
   displaying, in response to the gift being a target gift associated with first information, an information control corresponding to the first information on a live streaming page, wherein
   the first information is associated with the target gift before being sent by the target sending client, in response to a gift sending request at the target sending client.

9. The method according to claim 8, further comprising:
   displaying a first window on the live streaming page in response to a trigger operation on the information control, wherein the first window comprises the first information, and a plurality of pieces of second information that are associated with the target gift and received within a first preset time, the first information comprises information input from the target sending client, and the second information comes from other sending clients other than the target sending client.

10. The method according to claim 9, wherein the first window further comprises a plurality of selective controls respectively corresponding to the first information and the second information, and the method further comprises:
    displaying, in response to a trigger operation on a target selective control from the plurality of selective controls, first information or second information corresponding to the target selective control at a target position of the live streaming page.

11. The method according to claim 10, further comprising:
displaying, in the first window, the first information or the second information corresponding to the target selective control as being in a Done state; and
placing the first information or the second information corresponding to the target selective control at the bottom of the first window.

12. The method according to claim 10, further comprising:
ceasing display of the first information or the second information corresponding to the target selective control in response to a display time of the first information or the second information corresponding to the target selective control at the target position of the live streaming page exceeding a second preset time.

13. The method according to claim 9, wherein the first window further comprises a plurality of interactive live streaming controls respectively corresponding to the first information and the second information, and the method further comprises:
sending, in response to a trigger operation on a target interactive live streaming control from the plurality of interactive live streaming controls, an interactive live streaming invitation to a sending client of first information or second information corresponding to the target interactive live streaming control.

14. The method according to claim 9, wherein the displaying an information control corresponding to the first information on a live streaming page further comprises:
generating an information control corresponding to the first information on the live streaming page in response to the live streaming page not comprising an information control; or
updating, in response to the live streaming page comprising an information control, the information control based on the first information.

15. The method according to claim 14, wherein the generating an information control corresponding to the first information on the live streaming page further comprises:
performing a countdown for a display time of the information control based on a third preset time; and the method further comprises:
closing the information control in response to the countdown ending and no new information associated with the target gift being received; or
prolonging the countdown by a fourth preset time in response to the third preset time having not elapsed for the countdown and new information associated with the target gift being received.

16. The method according to claim 15, further comprising:
ceasing, in response to received information associated with the target gift comprising pending information when the information control is closed, display of the pending information in the first window when the information control is triggered next time and the first window is displayed.

17. A computer device, comprising one or more processors and a memory; and one or more programs, wherein the one or more programs are stored in the memory and executed by the one or more processors, and the program comprises instructions used to perform a method for sending a gift, comprising:
displaying a first window on a live streaming page in response to a trigger operation on a target gift control;
receiving first information input in the first window; and
in response to a gift sending request, sending a target gift corresponding to the target gift control and the first information; and
ceasing display of the first window, and displaying an effect corresponding to the target gift on the live streaming page.

18. A computer device, comprising one or more processors and a memory; and one or more programs, wherein the one or more programs are stored in the memory and executed by the one or more processors, and the program comprises instructions used to perform the method according to claim 8.

19. A non-volatile computer-readable storage medium comprising a computer program, wherein the computer program, when executed by one or more processors, causes the processor to perform the method according to claim 1.

20. A non-volatile computer-readable storage medium comprising a computer program, wherein the computer program, when executed by one or more processors, causes the processor to perform the method according to claim 8.

* * * * *